(12) United States Patent
Miyashita et al.

(10) Patent No.: US 9,899,051 B2
(45) Date of Patent: Feb. 20, 2018

(54) INFORMATION RECORDING AND PLAYBACK DEVICE

(71) Applicant: PANASONIC INTELLECTUAL PROPERTY MANAGEMENT CO., LTD., Osaka (JP)

(72) Inventors: Harumitsu Miyashita, Nara (JP); Akihito Yoshimi, Osaka (JP); Yoshihisa Takahashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 35 days.

(21) Appl. No.: 14/958,857

(22) Filed: Dec. 3, 2015

(65) Prior Publication Data
US 2016/0163347 A1 Jun. 9, 2016

(30) Foreign Application Priority Data

Dec. 3, 2014 (JP) .................................. 2014-244624
Sep. 29, 2015 (JP) .................................. 2015-191685

(51) Int. Cl.
G11B 7/09 (2006.01)
G11B 7/0037 (2006.01)
(Continued)

(52) U.S. Cl.
CPC ........ G11B 7/00375 (2013.01); G11B 7/0037 (2013.01); G11B 7/0079 (2013.01); G11B 7/08505 (2013.01); G11B 7/09 (2013.01); G11B 7/094 (2013.01); G11B 7/095 (2013.01); G11B 7/0945 (2013.01); G11B 7/268 (2013.01);
(Continued)

(58) Field of Classification Search
None
See application file for complete search history.

(56) References Cited

U.S. PATENT DOCUMENTS

2007/0291388 A1 12/2007 Yoshida et al.
2008/0008075 A1 1/2008 Horimai et al.
2010/0118673 A1* 5/2010 Nakamura ........... G11B 7/0079
369/53.17

FOREIGN PATENT DOCUMENTS

JP 04-134772 A 5/1992
JP 04-344349 A 11/1992
(Continued)

Primary Examiner — Brian Butcher
(74) Attorney, Agent, or Firm — McDermott Will & Emery LLP

(57) ABSTRACT

An information recording and playback device includes a recording and playback unit, and a controller. The controller divides a recording area of an optical disk into a first recording area which is at an inner circumference side, and a second recording area which is at an outer circumference side. The controller controls the recording and playback unit such that the unit records or plays back data in the first recording area at a first speed, and records or plays back data in the second recording area at a second speed slower than the first speed. The predetermined radius is set to a boundary between an area in which a control residual exceeds a predetermined reference value when servo control related to focusing and tracking is performed on the recording area of the optical disk, and an area in which the control residual does not exceed the predetermined reference value.

7 Claims, 19 Drawing Sheets

(51) Int. Cl.
- *G11B 7/095* (2006.01)
- *G11B 7/085* (2006.01)
- *G11B 7/007* (2006.01)
- *G11B 20/12* (2006.01)
- *G11B 7/26* (2006.01)
- *G11B 19/04* (2006.01)

(52) U.S. Cl.
CPC .......... *G11B 19/041* (2013.01); *G11B 19/048* (2013.01); *G11B 2020/1242* (2013.01)

(56) References Cited

FOREIGN PATENT DOCUMENTS

| | | | |
|---|---|---|---|
| JP | 07-093803 | A | 4/1995 |
| JP | 08-111074 | A | 4/1996 |
| JP | 2002-008323 | A | 1/2002 |
| JP | 2007-080363 | A | 3/2007 |
| JP | 2007-335012 | A | 12/2007 |
| JP | 2008-016128 | A | 1/2008 |

\* cited by examiner

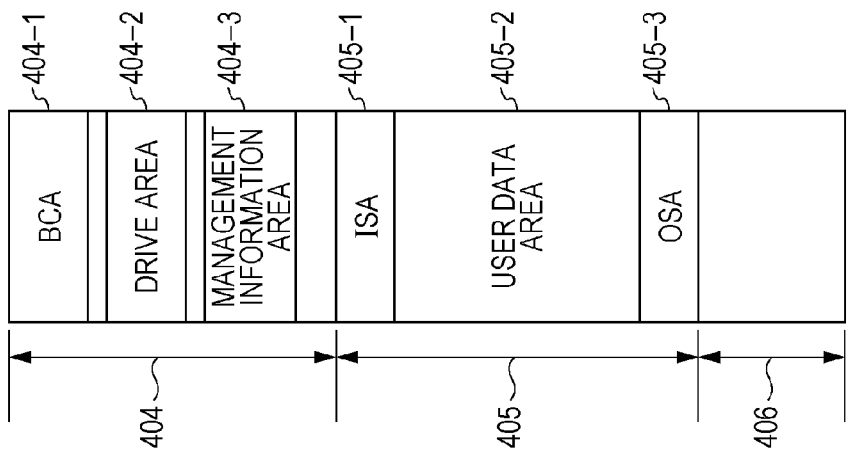
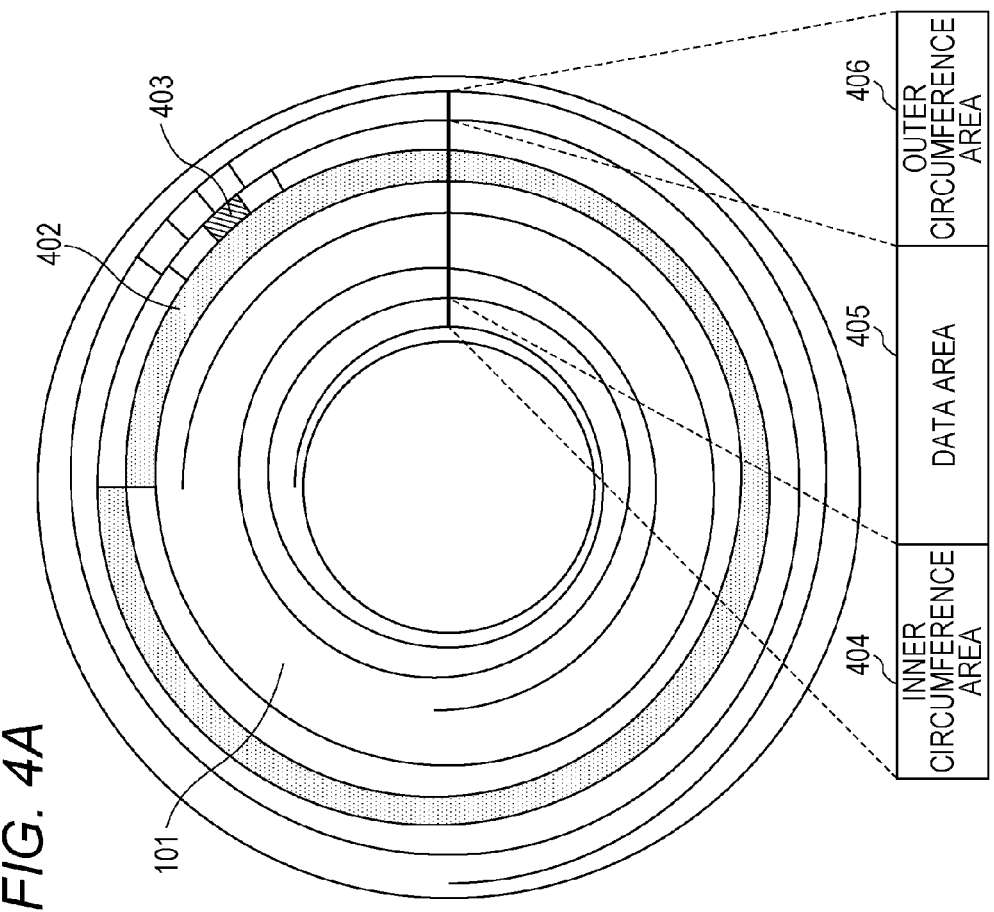

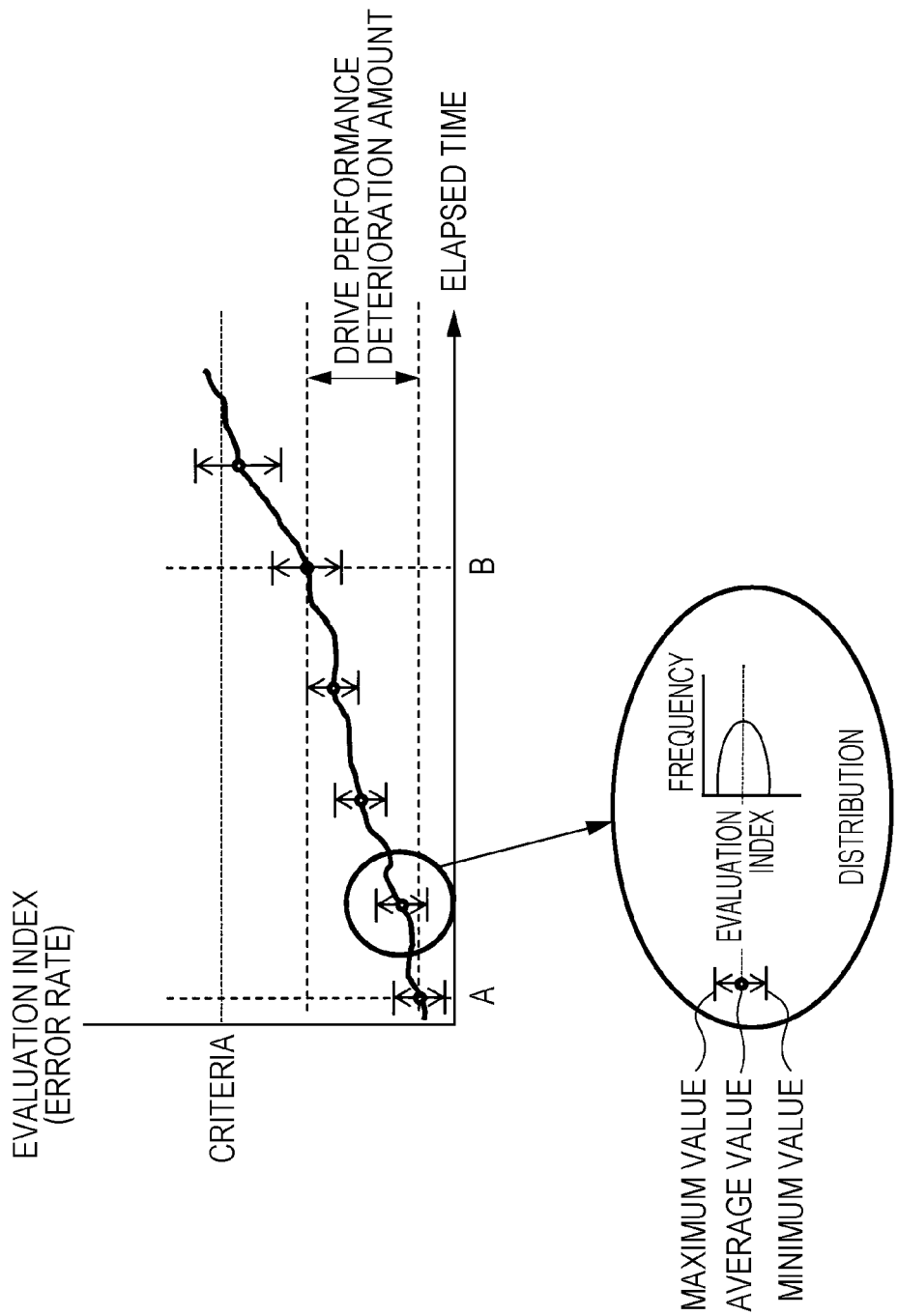

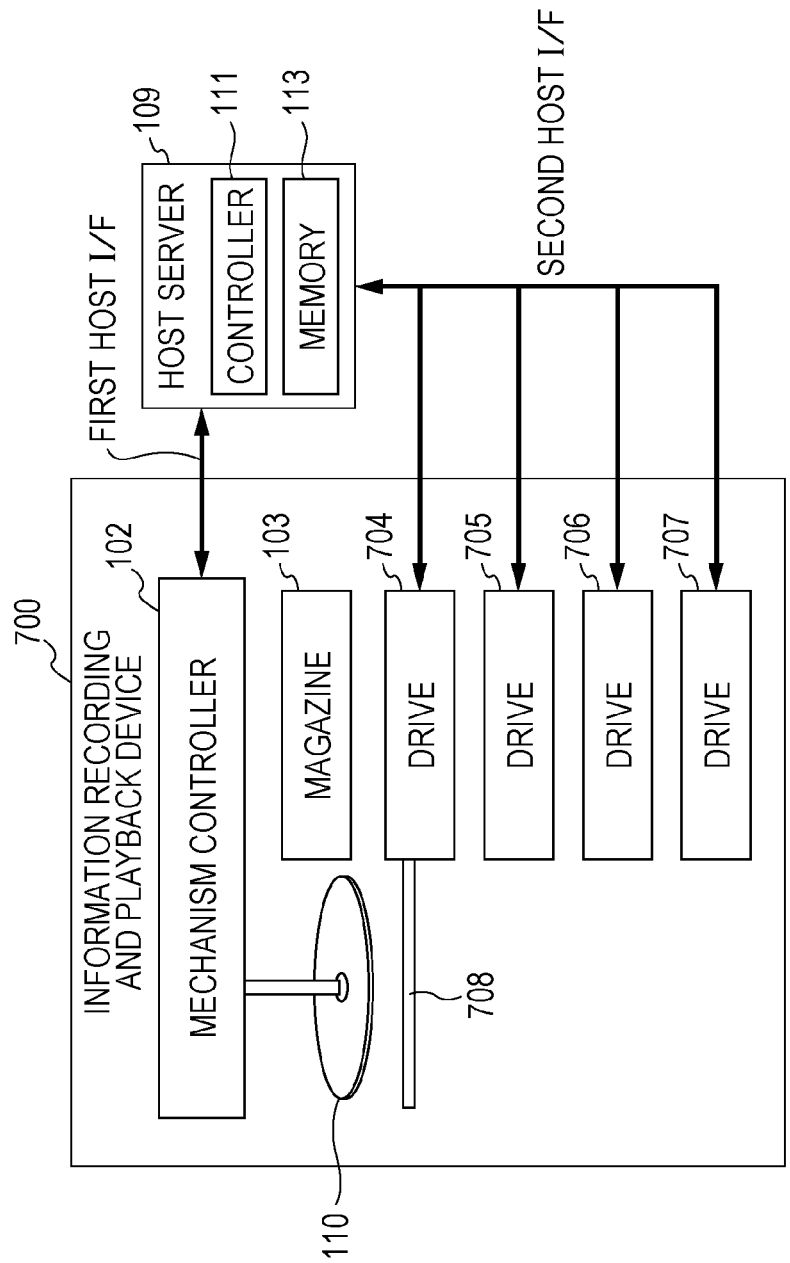

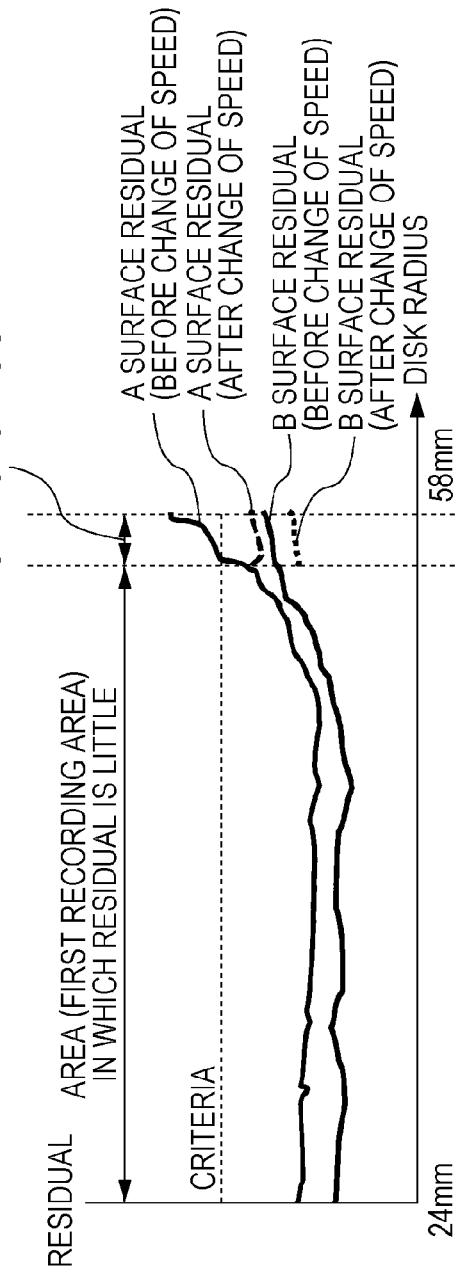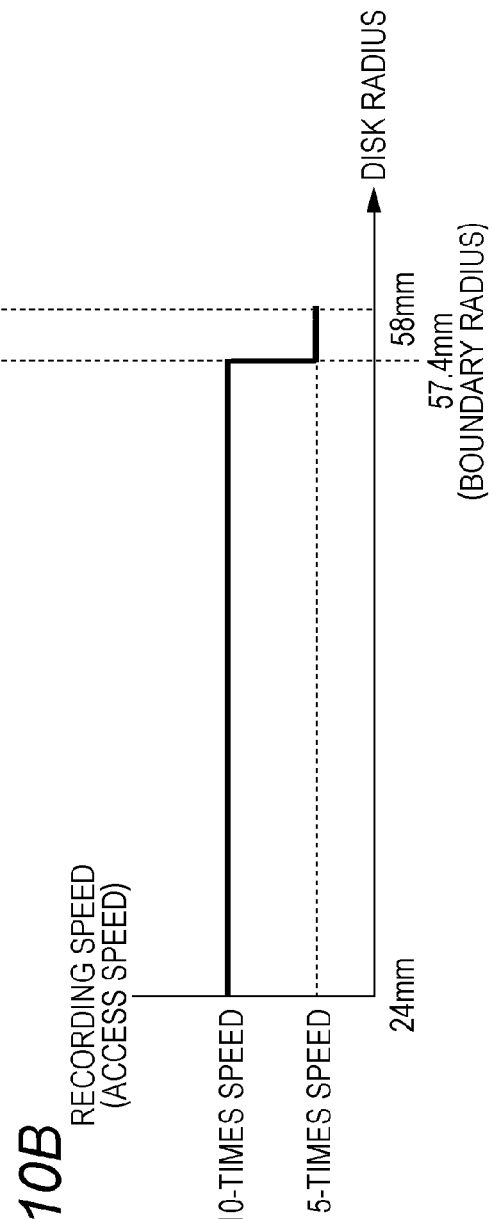

INFORMATION RECORDING AND PLAYBACK DEVICE

RELATED APPLICATIONS

This application claims the benefit of Japanese Application No. 2014-244624, filed on Dec. 3, 2014, and Japanese Patent Application No. 2015-191685, filed on Sep. 29, 2015, the disclosures of which Applications are incorporated by reference herein.

BACKGROUND

1. Technical Field

The present disclosure relates to an information recording and playback device which records or plays back data in or from an optical disk.

2. Description of the Related Art

As information recording and playback devices which record and play back data such as moving images and audios, information recording and playback devices such as detachable recording media optical disk drives and optical disk drive devices which handle the recording media are developed (see Unexamined Japanese Patent Publication No. 1107-93803, Unexamined Japanese Patent Publication No. 2002-8323, Unexamined Japanese Patent Publication No. 1104-134772, Unexamined Japanese Patent Publication No. 2007-335012, Unexamined Japanese Patent Publication No. 1108-111074 and Unexamined Japanese Patent Publication No. 2007-80363). An optical disk is a good recording medium compared to other recording media in terms of that an optical disk can store data for a long period of time.

However, a recording mark or a recording film of an optical disk temporally deteriorates, and, when the degree of deterioration worsens, recorded data cannot be played back in some cases.

Further, in a drive device which records or plays back data in or from an optical disk, an internal part or mechanism deteriorates depending on storage environment or use situation. The deterioration of the internal part or mechanism causes a problem that quality of a playback signal lowers or a recording mark cannot be normally formed, and causes a failure of data recording and playback operations of the optical disk in some cases.

Further, a variation in an optical disk manufacturing process (a variation of a recording track) also causes a focus error and a tracking error and, in some cases, causes servo control to fail and causes a failure of recording and playback operations.

SUMMARY

According to a first aspect of the present disclosure, an information recording and playback device which records or plays back data in or from an optical disk is provided. The information recording and playback device includes a recording and playback unit which records or plays back data in or from an optical disk by using laser light, and a controller which controls the recording and playback unit.

The controller divides a recording area of the optical disk into a first recording area which is at an inner circumference side based on, as a boundary, a predetermined radius in a radius direction of the optical disk, and a second recording area which is at an outer circumference side, and manages the recording area. The controller controls the recording and playback unit such that the recording and playback unit records or plays back data in the first recording area at a first speed, and records or plays back data in the second recording area at a second speed slower than the first speed.

The predetermined radius is set to a boundary between an area in which a control residual exceeds a predetermined reference value when servo control related to focusing and tracking is performed on the recording area of the optical disk, and an area in which the control residual does not exceed the predetermined reference value.

According to a second aspect of the present disclosure, the information recording and playback device includes a pickup which performs irradiation with laser light, and includes a recording and playback unit which records or plays back the data by irradiating the optical disk with laser light, and a controller which controls the recording and playback unit.

The controller divides a recording area of the optical disk into a first recording area which is at an inner circumference side based on, as a boundary, a predetermined radius in a radius direction of the optical disk, and a second recording area which is at an outer circumference side, and manages the recording area.

The predetermined radius is set to an edge of an area in which a control residual falls within a predetermined reference value or less when servo control related to focusing and tracking is performed on the recording area of the optical disk.

When recording or playing back data from a target position in the second recording area, the controller causes the pickup to make traverse movement to an innermost circumference position of the second recording area, causes the pickup to move while performing the servo control on the pickup after the traverse movement, and stores the control residual of the servo control in memory means. When the pickup reaches the target position, the controller performs the servo control by using the control residual stored in the memory means, and starts recording or playing back the data from the target position.

According to a third aspect of the present disclosure, the information recording and playback device includes a pickup which performs irradiation with laser light, and includes a recording and playback unit which records or plays back the data by irradiating the optical disk with laser light, and a controller which controls the recording and playback unit.

The controller divides a recording area of the optical disk into a first recording area which is at an inner circumference side based on, as a boundary, a predetermined radius in a radius direction of the optical disk, and a second recording area which is at an outer circumference side, and manages the recording area.

The predetermined radius is set to an edge of an area in which a control residual falls within a predetermined reference value or less when servo control related to focusing and tracking is performed on the recording area of the optical disk.

When data is recorded or played back from a target position in the second recording area, the controller reduces a number of rotations of the optical disk, causes the pickup to make traverse movement to the target position, performs the servo control on the pickup while increasing the number of rotations of the optical disk in an area to which the pickup has made the traverse movement, and stores a control residual of the servo control in memory means. Subsequently, when the number of rotations of the optical disk reaches a predetermine number of rotations, the controller performs the servo control by using the control residual stored in the memory means, and starts recording or playing back the data from the target position.

BRIEF DESCRIPTION OF DRAWINGS

FIG. 4A is a view for explaining a logical configuration of a recording area of an optical disk;

FIG. 4B is a view for explaining a logical configuration of a recording area of an optical disk;

FIG. 6 is a view illustrating a temporal change of an evaluation index (error rate) of the drive of the information recording and playback device;

FIG. 7 is a view illustrating a configuration of an information recording and playback device which supports a double-sided optical disk according to a second exemplary embodiment;

FIG. 10A is a view for explaining a relationship between a radius of an optical disk and a control residual.

FIG. 10B is a view of a relationship between a radius of the optical disk and a recording speed.

DETAILED DESCRIPTION

Figure 1:
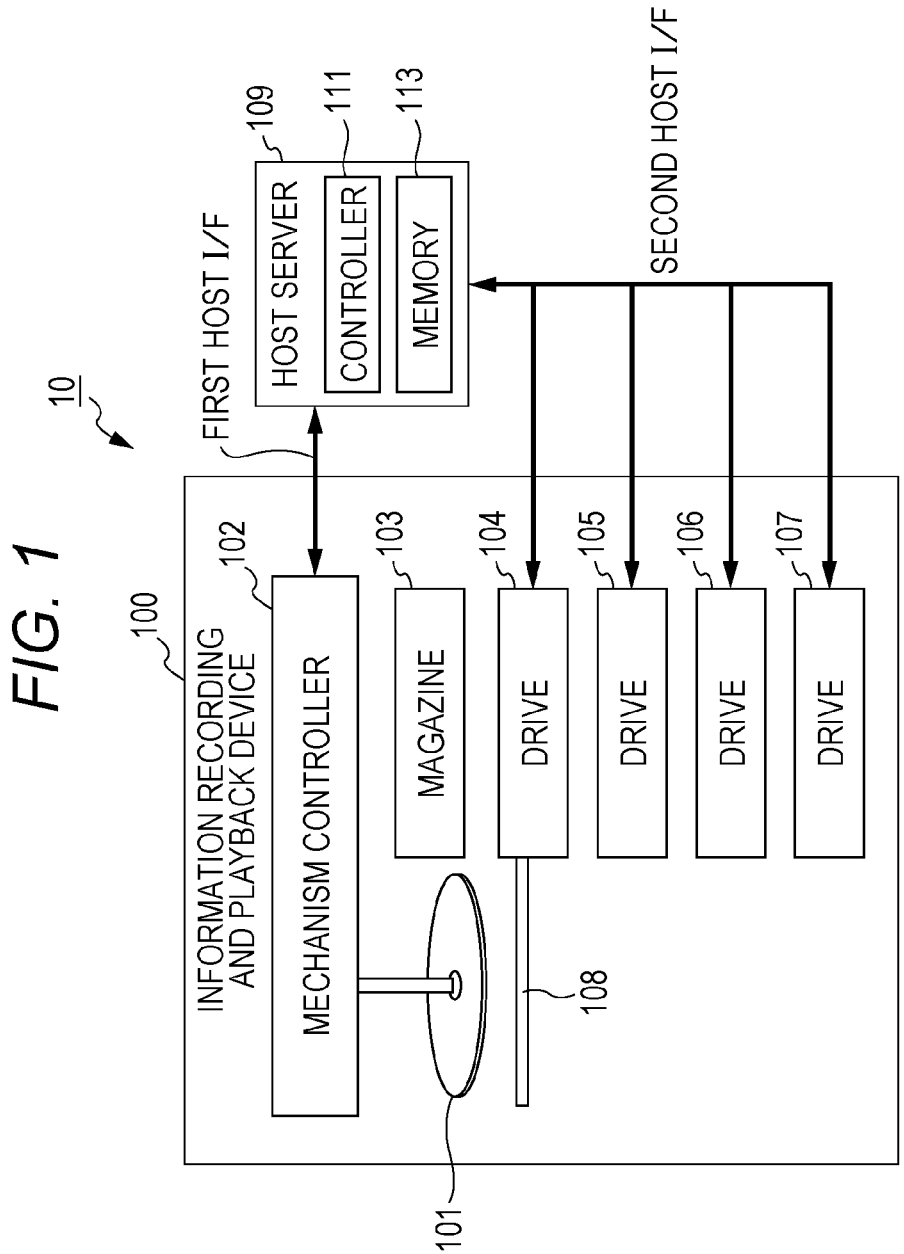
FIG. 1 is a view illustrating a configuration of an information recording and playback device according to a first exemplary embodiment.

Exemplary embodiments will be described below optionally with reference to the drawings. In this regard, the exemplary embodiments will not be described in detail more than necessary. For example, matters which are already well known will not be described in detail, and overlapping description of substantially same components will be omitted. This is to prevent the following description from becoming redundant more than necessary, and to facilitate the understanding of the exemplary embodiments for ordinary skill in the art.

In addition, the accompanying drawings and the following description are provided to facilitate the sufficient understanding of the present disclosure for ordinary skill in the art, and does not intend to limit a subject matter recited in the claims.

First Exemplary Embodiment

In an optical disk, a recording mark formed on the optical disk deteriorates depending on storage environment or a usage situation. This deterioration deteriorates quality of signals played back by an optical disk drive device, and, in the worst case, recorded information cannot be read (deterioration of data recorded in the optical disk). Further, temporal deterioration of recording films or the like of the optical disk makes it difficult to form a recording mark and makes it difficult to record data. In the worst case, it is not possible to record data such that a playback signal of quality which can be played back by the optical disk drive device is obtained (deterioration of recording performance of the optical disk).

Further, in the optical disk drive device, too, deterioration of a property of laser light, adherence of dust, deterioration of a channel for transmitting a played back signal and deterioration of a spindle motor which rotates the optical disk occur depending on storage environment or a usage situation. Such a deteriorated playback signal from the optical disk drive device cannot correctly play back a recording mark of a level which can be played back by a normal optical disk drive device without a problem, and causes deteriorated quality of the played back playback signal (deterioration of playback performance of an optical disk drive device). Further, factors such as the deterioration of the property of laser light and the deterioration of a channel of a recording signal also disable correct formation of a recording mark (deterioration of recording performance of the optical disk drive device).

As described above, there is a concern that temporal deterioration of at least one of the optical disk and the optical disk drive device makes it difficult to correctly record or play back data in or from the optical disk, and causes failure (operation failure). In the present exemplary embodiment, an information recording and playback device which diagnoses a failure of the information recording and playback device and determines to which one of an optical disk and the information recording and playback device a factor of the failure belongs.

1.1 Configuration of Information Recording and Playback System

FIG. 1 is a view for explaining a configuration of an information recording and playback system which uses an optical disk as a recording medium in the present exemplary embodiment.

Information recording and playback system 10 includes information recording and playback device 100 which records and plays back information in and from optical disk 101, and host server 109 which instructs information recording and playback device 100 to record and play back the information. Information recording and playback device 100 and host server 109 exchange data and commands via a host interface (referred to as "first and second host I/Fs" below).

Host server 109 transmits commands for instructing information recording and playback device 100 to record and play back data. Host server 109 includes controller 111 which realizes a function described below by executing programs, and memory 113 which is configured as a non-volatile memory. Controller 111 of host server 109 is configured as a CPU, and realizes the function described below by executing predetermined programs.

Information recording and playback device 100 includes magazine 103 which stores a plurality of optical disks 101, a plurality of optical disk recording and playback devices (referred to as "drives" below) 104 to 107 each of which is provided per optical disk 101 and records or plays back data in or from each optical disk 101, and mechanism controller 102 which conveys each optical disk from magazine 103 to drives 104 to 107.

Magazine 103 is an example of a disk storage which can store a predetermined number of optical disks 101. Each optical disk 101 according to the present exemplary embodiment is a write-once type optical disk, and includes recording layers on a single side surface.

Figure 2:
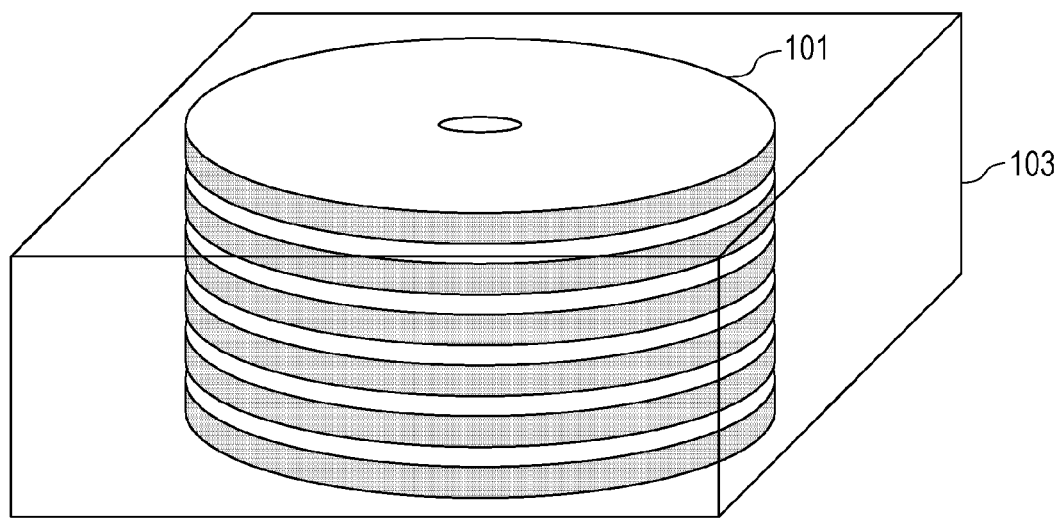
FIG. 2 is a view illustrating a configuration of a magazine in which a plurality of optical disks is stored according to the first exemplary embodiment.

FIG. 2 is a view illustrating a configuration of magazine 103 in which a plurality of optical disks 101 is stored. As illustrated in FIG. 2, a plurality of optical disks 101 is stored in magazine 103. In the present exemplary embodiment, in one magazine 103, twelve write-once type optical disks 101 are stored. A tray is not provided in magazine 103 to increase a stacking volume, and optical disks 101 are stored based on a direct stack method of directly stacking a plurality of optical disks 101. Optical disks 101 are taken out one by one from magazine 103 by mechanism controller 102. According to the configuration illustrated in FIG. 1, information recording and playback device 100 includes only one magazine 103. However, the configuration of information recording and playback device 100 is not limited to this. Information recording and playback device 100 may include a plurality of magazines 103.

Drives 104 to 107 include functions of recording or playing back data in or from each optical disk 101. Each of drives 104 to 107 includes tray 108 which conveys each optical disk 101 to an inside of each drive.

Figure 3:
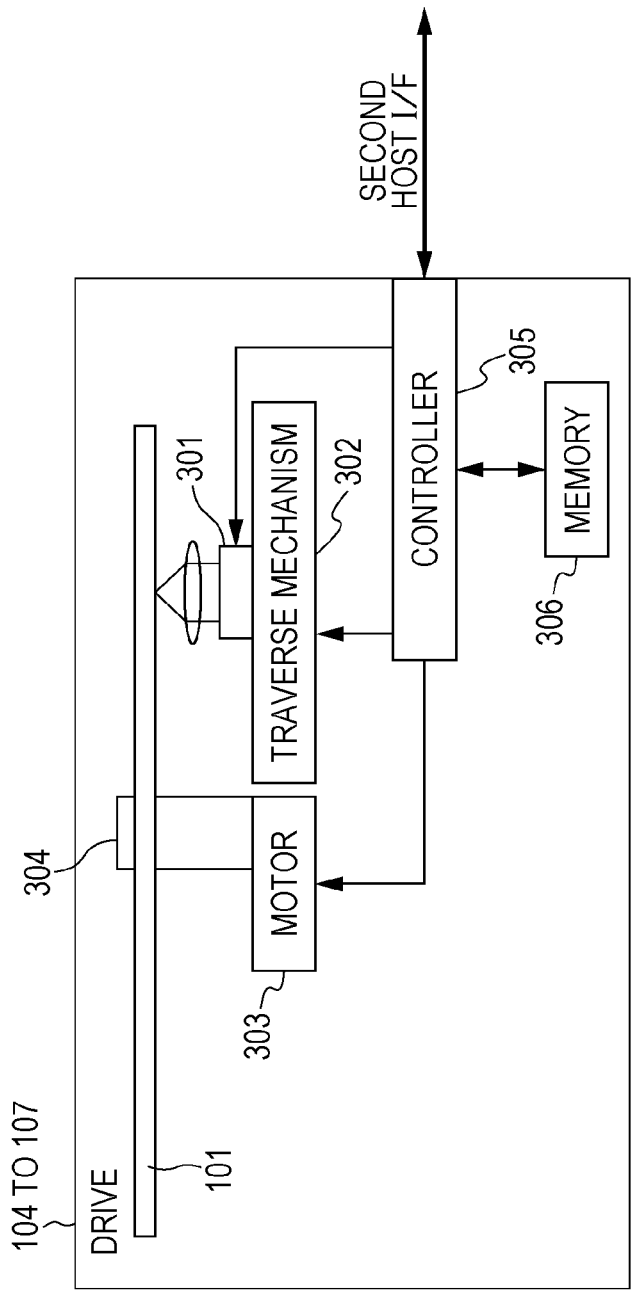
FIG. 3 is a view illustrating a configuration of a drive of the information recording and playback device according to the first exemplary embodiment.

FIG. 3 is a view illustrating an internal configuration of each of drives 104 to 107. As illustrated in FIG. 3, each of drives 104 to 107 includes pickup 301 which records and plays back information by irradiating optical disk 101 with laser light, traverse mechanism 302 which moves pickup 301 to record and play back information at a predetermined position on optical disk 101, spindle motor 303 which rotates optical disk 101, magnet 304 which fixes optical disk 101 onto spindle motor 303, controller 305 which controls pickup 301, traverse mechanism 302 and spindle motor 303, and memory 306 which is configured as a non-volatile memory.

Controller 305 is configured as a CPU, and realizes the function described below by executing a predetermined program. Controller 305 includes second host I/F which bidirectionally transmits data and various commands to external host server 109 connected with drives 104 to 107. Further, controller 305 includes a signal processing function of decoding data from a signal from pickup 301 to play back data recorded in optical disk 101, and correcting errors. Controller 305 can measure signal quality such as an error rate and stores signal quality measurement results in non-volatile memory 306 in chronological order. Each signal quality measurement result can be transmitted to host server 109 via second host I/F. Further, it is possible to transmit to host server 109 various pieces of information which are necessary for control performed by controller 305.

Host server 109 optimally controls information recording and playback device 100 by using information transmitted from each of drives 104 to 107. Controller 305 receives data via second host I/F and converts the received data into recording data to record data in optical disk 101. Controller 305 irradiates optical disk 101 with a recording pulse based on the recording data from pickup 301, and records data. In addition, information recording and playback device 100 illustrated in FIG. 1 includes the four drives. However, a drive configuration is not limited to this. Information recording and playback device 100 may include three drives or less or five drives or more.

Mechanism controller 102 includes a function of taking out optical disk 101 from magazine 103, and conveying and loading optical disk 101 to one of drives 104 to 107, and a function of taking out optical disk 101 from each of drives 104 to 107 and storing optical disk 101 in magazine 103. That is, mechanism controller 102 includes a mechanism which takes out optical disk 101 from magazine 103, a mechanism which conveys optical disk 101, a mechanism which stores optical disk 101 in magazine 103 and a controller which controls these mechanisms. Further, mechanism controller 102 includes a mechanism which pulls optical disk 101 out from or in magazine 103, and can take out optical disks 101 one by one from magazine 103 by using this mechanism.

Next, the interfaces (I/F) of the information recording and playback device and host server 109 will be described. As illustrated in FIG. 1, information recording and playback device 100 is connected with host server 109 via first host I/F and second host I/F.

First host I/F is an interface which communicates with and controls mechanism controller 102 in information recording and playback device 100, and, for example, an iSCSI (Internet Small Computer System Interface) or a USB is used for first host I/F.

Second host I/F is an interface which communicates with and controls drives 104 to 107 in information recording and playback device 100, and, for example, a SAS (Serial Attached SCSI), an iSCSI, a FC (Fiber Channel) or a SATA (Serial ATA) is used for second host I/F. Host server 109 is connected with all drives 104 to 107 via second host I/F such that drives 104 to 107 can be controlled one by one. Information recording and playback device 100 and host server 109 may be further connected additionally with a Serial interface or the like. In addition, information recording and playback device 100 may include a SAS-SATA conversion board. In this case, host server 109 and information recording and playback device 100 are connected by the SAS, and may be connected with each drive by the SATA in information recording and playback device 100.

1.2 Optical Disk Structure

FIG. 4A is a view for explaining a logical configuration of a recording area of an optical disk according to the present exemplary embodiment. Optical disk 101 of a disk shape includes one or more recording layers in which information can be recorded and played back. In each recording layer, multiple tracks 402 are spirally formed, and, in each track 402, multiple blocks 403 which are divided into a plurality of blocks are formed. By wobbling grooves of track 402, address information (referred to as a physical address below) indicating a detailed position on a disk is allocated.

In this regard, track 402 may be configured to enhance a recording density of the track by recording data of an optical disk recorded only in a conventional groove (groove) or a land (inter-groove) in both of the groove and the land.

A width (track pitch) of track 402 is 0.32 μm in case of, for example, a Blu-ray (registered trademark) disk (BD). Block 403 is an error correction unit, and is a minimum unit at which recording and playback operations are performed. For example, block 403 has sizes such as 1 ECC (Error Correction Code) (size: 32 KBytes) in case of a DVD (registered trademark), and one cluster (size: 64 Kbytes) in case of a BD. When a sector (size: 2 KBytes) which is a minimum unit of data of an optical disk is used to describe, 1 ECC=16 sectors and 1 cluster=32 sectors hold. In addition, a "cluster" described below has the same meaning as block 403.

Optical disk 101 includes inner circumference area 404, data area 405 and outer circumference area 406.

FIG. 4B is a view illustrating an area structure of optical disk 101. Data area 405 includes user data area 405-2 in which user data is recorded, and ISA (Inner Spare Area) (405-1) and OSA (Outer Spare Area) (405-3) which are provided at an inner circumference side and an outer circumference side of user data area 405-2, respectively. ISA (405-1) and OSA (405-3) are spare areas each including an alternate area which is used for alternate recording of a defect area detected in user data area 405-2.

Inner circumference area 404 and outer circumference area 406 each mainly include an area in which management information which is necessary to record and play back data in and from optical disk 101 is recorded. Inner circumference area 404 and outer circumference area 406 each play a role of a margin area to track 402 when pickup 301 (FIG. 3) accesses an edge of data area 405 and even when pickup 301 overruns.

Inner circumference area 404 is an area which is also referred to as "read-in", and is an area in which optical disk drives 104 to 107 (FIG. 3) record and play back data. Inner circumference area 404 is an area which is different from user data area 405-2 and in or from which a user cannot directly record or play back data. Inner circumference area 404 includes areas such as BCA (Burst Cutting Area) 404-1, drive area (Drive Area) 404-2 or management information area (Defect Management Area: DMA) 404-3.

BCA 404-1 is a pre-recording area in which disk related information and information unique to each disk are formed on a bar code by using a special device in a manufacturing stage of optical disks 101, and is an area which is formed by, for example, removing a reflection film by laser light. In BCA 404-1, information such as a unique Serial number is stored per optical disk 101.

Drive area 404-2 is an area which includes information which is necessary to control these optical disk drives 104 to 107, and is an area in which information can be freely recorded.

Management information area 404-3 is an area in which management information such as information related to an area structure of data area 405 in optical disk 101, information related to a defect block or information indicating a recording state of optical disk 101 can be transiently recorded.

In addition, inner circumference area 404 of optical disk 101 may additionally include areas such as an OPC area for recording power adjustment of optical disk drives 104 to 107 and a PreWrite area for tracking/focus adjustment. However, these areas will not be described.

1.3 Failure Factor of Information Recording and Playback Device

A failure of information recording and playback device 100 refers to a state where recorded data cannot be read. There are following three factors as failure factors.

A first factor derives from quality of optical disk 101. The factor deriving from quality of optical disk 101 includes a defect partially generated in optical disk 101, a decrease in recording quality due to that recording cannot be performed under identical conditions due to a rapid change in recording film characteristics even when recording conditions are optimized, and a decrease in recording quality due to aged deterioration of recording films caused by prolonged storage.

A second factor is a decrease in recording quality since the recording conditions of drives 104 to 107 are not optimal. That is, the second factor is the decrease in the recording quality since parameters such as recording power and a recording pulse are not optimized.

A third factor is a decrease in recording quality caused when playback performance deteriorates due to aged deterioration of drives 104 to 107, and recording quality is checked in this state.

Next, a counter measure for the above failure factors will be described.

There is a probability that it is possible to eliminate to some degree poor disks having defects partially generated in optical disks 101 and changes in recording film characteristics in the first factor. Further, by using a defect exchange system which records the above-described defect area in an alternate recording area, there is a probability that it is possible to eliminate a situation that recording data cannot be read. Thus, immediately after recording, there is a probability that it is possible to prevent a partial area from causing a situation that recording data cannot be read, by using a defect exchange system. This defect exchange system supports only failures of partial areas, and therefore there is a probability that it is not possible to support multiple defect areas. There is a probability that a decrease in recording quality caused by aged deterioration of recording films due to prolonged storage causes a failure of an entire disk instead of a partial failure, and therefore requires an immediate data recovery operation.

As to deterioration of the recording state which is the second factor and is caused since the recording conditions of drives 104 to 107 are not optimized, it is possible to check recording quality by conducting a recording test before actual recording starts, so that is possible to eliminate failures with considerable probability.

Due to the deterioration of playback performance which is the third factor and is caused by aged deterioration of drives 104 to 107, it is determined that recording quality is poor even though the recording state is good. It is difficult to avoid the aged deterioration of drives 104 to 107, and therefore it is possible to determine a deterioration situation of the device by performing determination on a regular basis as described below.

1.4 Signal Quality Determining Function

Next, the signal quality determining function of each of drives 104 to 107 of information recording and playback device 100 will be described.

In management information in optical disk 101, in which physical address range on the disk data has been recorded is recorded. A measurement area (address range) for determining signal quality is determined based on this information. Each recording film of the disk has different characteristics at an inner circumference side and an outer circumference side, and therefore signal quality may be determined at two portions of at least the inner circumference side and the outer circumference side. Further, when a disk is a multilayer disk, a recording film has different characteristics per layer, and therefore signal quality may be determined per layer.

An error rate index can be used for signal quality determination. An error rate is calculated in error correction units in the determined measurement area. In case of a BD, the error correction unit is one cluster (size: 64 Kbytes). It is desirable to measure a plurality of clusters to secure accuracy to measure the error rate index. Further, an error rate related to a random error from which a burst is removed (such an error rate will be referred to as a "random error rate" below) is also calculated to measure an error rate. Thus, when an error rate is bad, it is possible to determine whether the error rate is bad due to a defect or due to a random error generated when recording quality. For example, a burst error may be calculated as a random error rate by defining 40 Bytes or more and counting only errors less than 40 Bytes. Further, to check signal quality by deleting a micro defect, too, a random error rate may be calculated by counting only errors which continue over 1 Byte or 2 Bytes. Criteria of a symbol error rate in case of a BD is generally about $4.2 \times 10^{-3}$ based on error correction performance. When a system margin is taken into account, a value of the criteria needs to be made lower than this value. Meanwhile, when it is grasped that playback performance of a drive lowers, and when recording quality of the disk is determined, the value of the criteria may be increased. The criteria may be changed every time based on determination criteria.

In addition, an index of signal quality determination is not limited only to an error rate index. Signal quality such as a jitter, an asymmetry, β and a modulation factor can also be used.

1.5 Failure Prevention Diagnosis Processing

The following processing relates to failure prevention diagnosis processing of checking states of an optical disk and the information recording and playback device by determining signal quality before data cannot be read. By determining a diagnosis result according to this failure prevention diagnosis processing, it is possible to take a countermeasure for preventing occurrence of a failure in advance.

Information recording and playback device 100 according to the present exemplary embodiment includes a plurality of optical disks 101 and a plurality of drives (optical disk recording and playback devices) 104 to 107. According to this configuration, by determining signal quality based on a combination of optical disks 101 and drives 104 to 107, it is possible to diagnose whether a failure derives from a disk or from a drive or tends to occur (a state indicating characteristics that the failure does not exceed the criteria but almost exceeds the criteria).

More specifically, when quality of a given specific optical disk is checked in a plurality of drives and it is determined by a plurality of drives that quality of a playback signal is bad, it is possible to determine that the there is a probability of a failure caused by a disk. Meanwhile, when it is determined by a given specific drive that signal quality is bad, it is possible to determine that there is a probability of a failure deriving from a drive.

A specific process of the failure prevention diagnosis processing will be described with reference to FIGS. 5A and 5B.

Figure 5A:
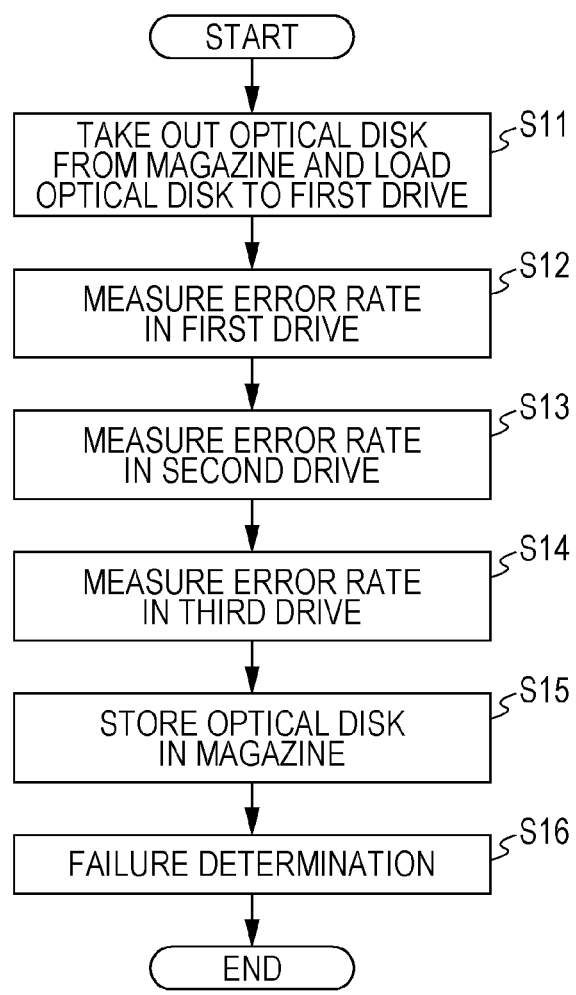
FIG. 5A is a flowchart illustrating failure prevention diagnosis processing of the information recording and playback device according to the first exemplary embodiment.
Figure 5B:
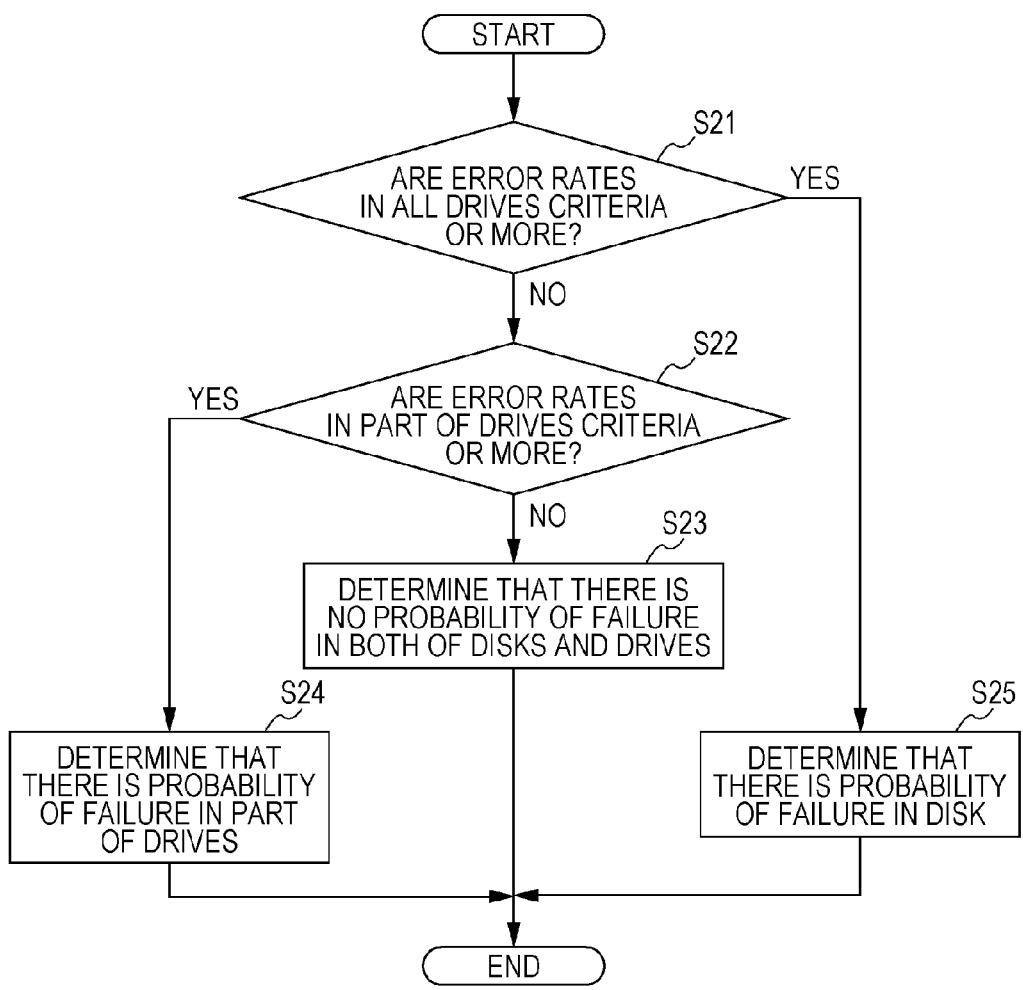
FIG. 5B is a flowchart illustrating details of failure determination processing of the failure prevention diagnosis processing.

FIGS. 5A and 5B illustrate examples of processing of checking a recording state of given optical disk 101 by using three drives. An operation in each step is realized when mechanism controller 102 and controller 305 of each of drives 104 to 106 perform control based on commands sequentially issued by host server 109.

1) Controller 111 of host server 109 takes out one specific disk from magazine 103 via first host I/F, and issues a command for causing the disk to be conveyed to drive 104. In response to this command, the controller of mechanism controller 102 takes out the one specific disk from magazine 103, and loads the disk to first drive 104 (S11).

2) Next, controller 111 of host server 109 causes information recording and playback device 100 to measure an error rate when the optical disk is played back by drive 104 (S12). Hence, controller 111 of host server 109 issues a command for taking out tray 108 of drive 104 via second host I/F, and issues a command for placing optical disk 101 on tray 108 via first host I/F. Further, controller 111 of host server 109 issues a command for inserting optical disk 101 and activating drive 104 via second host I/F. Furthermore, controller 111 of host server 109 issues a command for measuring an error rate of optical disk 101 via second host I/F.

When information recording and playback device 100 receives these commands from host server 109, mechanism controller 102 places optical disk 101 on tray 108. Drive 104 causes optical disk 101 to be inserted inside, plays back optical disk 101, reads information which is necessary to activate the drive (described in detail below) and activates optical disk 101 by using the read information. Subsequently, drive 104 measures an error rate of a predetermined area on the optical disk, obtains a measurement result (A) and transmits the measurement result to host server 109. Subsequently, controller 111 of host server 109 causes drive 104 to stop, and controls information recording and playback device 100 to take out tray 108 of optical disk 101.

3) Next, controller 111 of host server 109 issues a command via first host I/F, takes out optical disk 101 from tray 108 and conveys the disk to second drive 105.

4) Next, controller 111 of host server 109 causes information recording and playback device 100 to measure an error rate when the optical disk is played back by drive 105 (S13). Hence, host server 109 issues a command via second host I/F, takes out tray 108 of drive 105, issues a command via first host I/F and disposes optical disk 101 on tray 108 of drive 105. Controller 111 of host server 109 issues a command via second host I/F, and inserts optical disk 101 into drive 105 and activates drive 105. Further, controller 111 of host server 109 issues a command for measuring an error rate of optical disk 101 via second host I/F.

When information recording and playback device 100 receives these commands from host server 109, mechanism controller 102 places optical disk 101 on tray 108. Drive 105 causes optical disk 101 to be inserted inside, plays back optical disk 101, reads information which is necessary to activate the drive and activates optical disk 101 by using the read information. Subsequently, drive 105 measures an error rate of a predetermined area on optical disk 101, obtains a measurement result (B) and transmits the measurement result to host server 109. Subsequently, host server 109 causes drive 105 to stop and takes out tray 108 of drive 105.

5) Next, controller 111 of host server 109 issues a command via first host I/F, takes out optical disk 101 from tray 108 of drive 105 and conveys optical disk 101 to third drive 106.

6) Next, controller 111 of host server 109 causes information recording and playback device 100 to measure an error rate when the optical disk is played back by drive 106 (S14). Hence, controller 111 of host server 109 issues a command via second host I/F, takes out tray 108 of drive 106, issues a command via first host I/F and disposes optical disk 101 on tray 108. Further, controller 111 of host server 109 issues a command via second host I/F, inserts optical disk 101 into drive 105 and activates drive 106, and measures an error rate. Drive 106 measures an error rate of a predetermined area on optical disk 101, obtains a measurement result (C) and transmits the measurement result to host server 109. Subsequently, host server 109 causes drive 106 to stop, and takes out tray 108 of drive 106.

7) Subsequently, optical disk 101 is returned to magazine 103 and stored. Next, controller 111 of host server 109 issues a command via first host IT, takes out optical disk 101 from tray 108 of drive 106, conveys optical disk 101 to magazine 103 and inserts optical disk 101 into magazine 103.

8) Controller 111 of host server 109 determines a failure based on the measurement results (A) to (C) (S16). That is, whether or not a failure occurs is diagnosed and, when a failure occurs, whether or not a failure derives from a disk side or from a drive side is diagnosed.

FIG. 5B is a flowchart illustrating failure determination processing performed by controller 111 of host server 109. Controller 111 of host server 109 determines a failure based on the measurement results (A) to (C). More specifically, when all error rates indicated by the measurement results (A) to (C) are the criteria or more (YES in S21), controller 111 determines that there is a probability of a failure in optical disk 101 (S25). Meanwhile, when measured error rates of part of drives are the criteria or more (YES in S22), controller 111 determines that there is a probability of a failure in the part of drives (S24). Further, when all error rates indicated by the measurement results (A) to (C) are the criteria or less (NO in S22), controller 111 determines that there is not a probability of a failure in any one optical disk 101 and drives 104 to 106 (S23).

In the above example, an example where the three drives are used has been described. The present invention is not limited to this. By diagnosing signal quality by using at least two or more drives, it is possible to determine a failure. Four or more drives may be used to further improve accuracy of failure determination.

Activating and stopping the drives are repeated to measure error rates in a plurality of drives, and therefore a processing time is required to activate the drives. It is possible to reduce a drive activation time by using a following method.

That is, one specific disk is repeatedly activated and stopped and each of the drives shares information which is necessary to activate optical disk 101 via host server 109. Consequently, it is possible to reduce an activation time. The information which is shared as information which is necessary upon activation includes type information for distinguishing a disk type such as a BD or a BDXL (registered trademark), and disk type information such as a number of recording layers and a single-sided or double-sided disk. Further, the information to be shared may include information which is unique to a disk and is recorded in BCA 404-1 and/or management information 404-3 described above. Host server 109 stores these pieces of information in memory 113 when these pieces of information are read upon activation of the first drive. Further, host server 109 transmits the stored information to second and subsequent drives, and activates a drive by using the information stored in memory 113 upon activation of the second and subsequent drives. Consequently, it is possible to omit (skip) disk distinguish processing executed in processing of activating the second or subsequent drive or optical disk playback processing of obtaining activation information upon measurement of an error rate. Consequently, it is possible to reduce an activation time.

Further, commands (control) from above host server 109 may be realized by packaged API commands.

1.6 Failure Prevention Diagnosis Processing which Takes into Account Drive Playback Performance Playback performances of drives 104 to 107 vary per drive and have different aged deterioration speeds, too. In such a case, even when signal quality is evaluated by a plurality of drives, signal quality of an optical disk cannot be adequately evaluated. A signal quality evaluating method which takes into account a temporal change of a level of playback quality of each drive will be described. Each of drives 104 to 107 stores in memory 306 a result obtained by evaluating recording quality of optical disk 101 which temporally changes compared to quality upon shipping, and evaluates signal quality by using a temporal change of the stored recording quality.

FIG. 6 is a view illustrating a temporal change of playback performance of a drive provided by plotting an evaluation index (error rate) of a given drive on a vertical axis and an elapsed time on a horizontal axis. For measurement variations, there are various factors such as a medium factor, a recording condition factor and a playback parameter factor. A maximum value, a minimum value and an average value have been stored plotted per predetermined elapsed time (a time passed from manufacturing of a drive), and it has been observed that an evaluation index has variation σ and gradually deteriorated.

When recording quality of a disk is diagnosed by using a drive having such deterioration characteristics which temporally change, it is probable that quality cannot be adequately diagnosed based on fixed criteria. Hence, by temporally changing the criteria based on temporal deterioration characteristics of a drive and evaluating signal quality by using the criteria, it is possible to perform failure prevention diagnosis which takes playback performance of the drive into account.

As illustrated in FIG. 6, a drive performance deterioration amount (=a difference between an average value of performances at early measurement time A and an average value of measurement performances at measurement period B) at measurement period B is calculated as a measurement result (reference value) that characteristics at early measurement period A are adequate playback quality. Further, by temporally setting criteria by taking into account the drive performance deterioration amount and measurement variation σ and evaluating an optical disk by using the temporally set criteria, it is possible to appropriately determine recording quality of a disk which temporally changes.

More specifically, this is expressed by a following equation. Criteria which temporally change are set per drive.

$$\text{Criteria} = \text{Reference Criteria}(4.2 \times 10^{-3}) + \text{Drive Performance Deterioration Amount} + \text{Measurement Variation}$$

In addition, in case where initial performance of a drive is managed and shipped, performance at an early measurement period may be regarded as 0 or a predetermined fixed value. When the fixed value is sufficiently small, the drive performance deterioration amount can take an average value of playback performances measured at a predetermined period.

As described above, the criteria which temporally change are set per drive. Further, failure determination is performed according to the same process as the process described in above "1.5 Failure Prevention Diagnosis Processing" by using the criteria set per drive.

This method is a method which assumes that disk quality is managed to some degree and disks are shipped, and a change in characteristics does not influence signal quality in a drive.

Naturally, it is possible to predict a failure of a drive based on data of each drive illustrated in FIG. 6, and use this prediction for a service such as a notification for an advance exchange.

According to information recording and playback device 100 of the present exemplary embodiment, information recording and playback device 100 can determine whether or not there is a probability that a normal data access cannot be made and determine whether a factor that the normal data access cannot be made derives from optical disk 101 or information recording and playback device 100 (drives 104 to 106). Consequently, it is possible to take an appropriate measure before data is erased.

Second Exemplary Embodiment

In the first exemplary embodiment, failure prevention diagnosis processing of an information recording and playback device which records and plays back information in and from optical disk 101 including recording layers only in a single side surface, and which includes drives 104 to 107 has been described. In the present exemplary embodiment, failure prevention diagnosis processing of an information recording and playback device which includes optical disks (referred to as "double-sided optical disks" below) including recording layers on both surfaces, and drives which can simultaneously record and play back data on and from the both surfaces of each double-sided optical disk will be described. In addition, the same components as the components of the first exemplary embodiment will be assigned the same reference numerals and will not be repeatedly described.

2.1 Configuration of Information Recording and Playback Device

FIG. 7 is a view illustrating a configuration of the information recording and playback device which uses optical disks according to the present exemplary embodiment. Information recording and playback device 700 according to the present exemplary embodiment also records or plays back data in or from write-once type optical disk 110 including recording layers on both surfaces in response to an instruction from host server 109.

Information recording and playback device 700 includes magazine 103 which stores a plurality of double-sided optical disks 110, a plurality of drives (optical disk recording and playback devices) 704 to 707 each of which records or plays back data in or from each double-sided optical disk 110, and mechanism controller 102 which conveys optical disk 110 from magazine 103 to drives 704 to 707.

Drives 704 to 707 each include a function of recording or playing back data simultaneously in or from the both surfaces of double-sided optical disk 110. Each of drives 704 to 707 includes tray 708 which conveys optical disk 110 to an inside of each drive. Drives 704 to 707 each employ the same configuration, and therefore a configuration and an operation of drive 704, out of drives 704 to 707, will be described.

Figure 8:
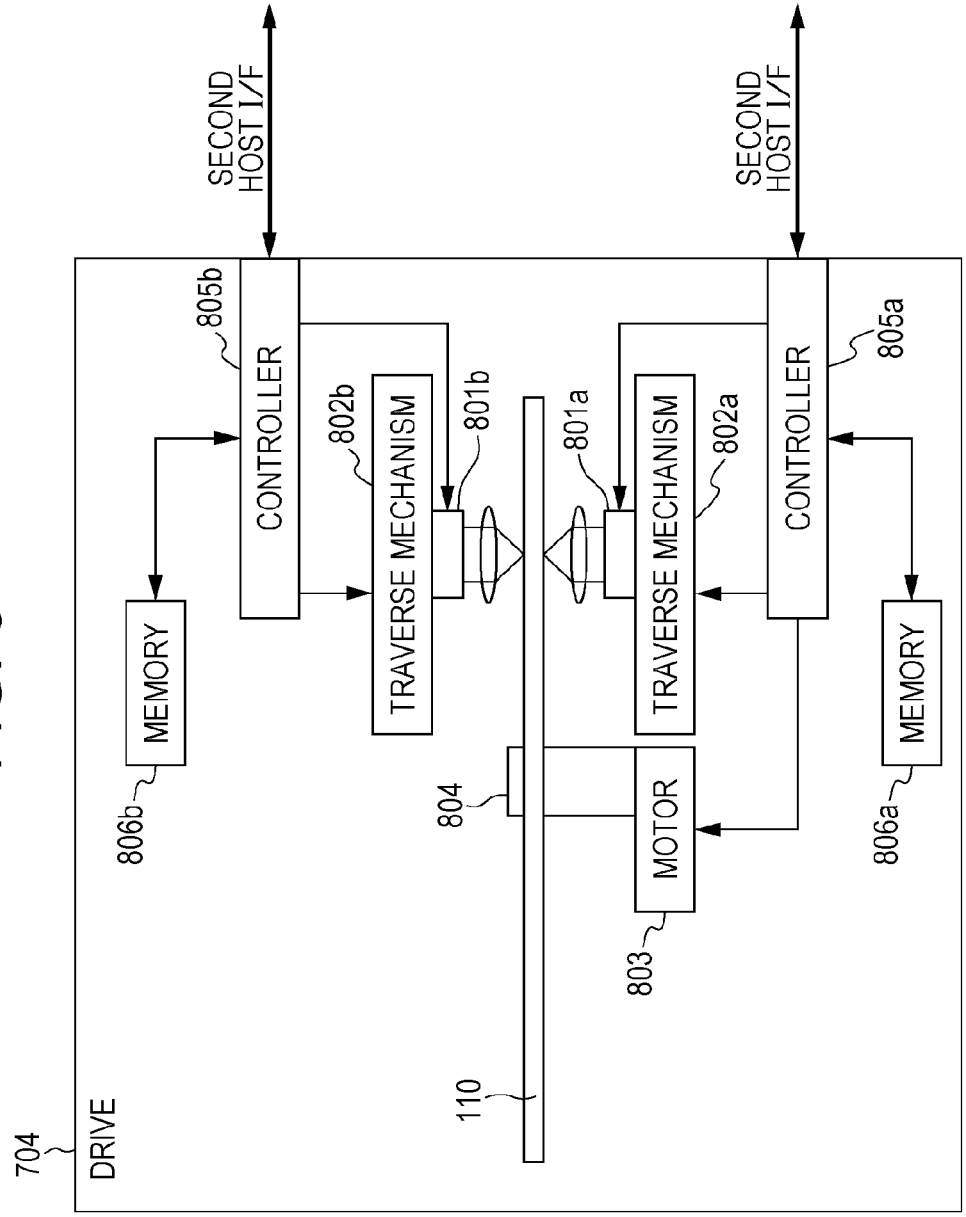
FIG. 8 is a view illustrating a configuration of a drive which supports a double-sided optical disk according to the second exemplary embodiment.

FIG. 8 is a view illustrating an internal configuration of drive 704. As illustrated in FIG. 8, drive 704 includes pickups 801a, 801b which record and play back data by irradiating optical disk 110 with laser light, traverse mechanisms 802a, 802b which cause pickups 801a, 801b to move, spindle motor 803 which rotates optical disk 110, magnet 804 which fixes optical disk 110 onto spindle motor 803, controller 805a which controls pickup 801a, traverse mechanism 802a and spindle motor 803, and controller 805b which controls pickup 801b and traverse mechanism 802b. Further, drive 704 includes memories 806a, 806b which are configured as non-volatile memories which store information used for control performed by controllers 805a, 805b.

Controllers 805a, 805b are each configured as a CPU, and realizes a function described below by executing a predetermined program. Controllers 805a, 805b each include second host I/F which can bidirectionally transmit data and various commands by way of communication to external host server 109 connected with drive 704. Further, controllers 805a, 805b each include a signal processing function of decoding data from signals from pickups 801a, 801b to play back data recorded in optical disk 110, and correcting errors. Controllers 805a, 805b store data in non-volatile memories 806a, 806b. Each signal quality measurement result can be transmitted to host server 109 via second host I/F. Further, it is possible to transmit to host server 109 various pieces of information which are necessary for control performed by controllers 805a, 805b.

Host server 109 can optimally control information recording and playback device 700 by using information transmitted from each of drives 704 to 707. Controllers 805a, 805b each receive data via second host I/F and converts the received data into recording data when recording the data in double-sided optical disk 110. Controllers 805a, 805b can each record data by irradiating optical disk 110 with a recording pulse (not illustrated) based on the recording data from pickups 801a, 801b.

Differences from the configurations of drives 104 to 107 illustrated in FIG. 3 are that the recording data from host server 109 is transmitted by way of time division to one of controller 805a and controller 805b via second host I/F, and is recorded simultaneously on both surfaces of optical disk 110. When a disk on which data has been recorded on both surfaces of the disk by way of time division is played back, the both surfaces need to be simultaneously played back. That is, data is recorded or played back simultaneously on or from the both surfaces of optical disk 110. Thus, by recording or playing back data simultaneously on or from both surfaces of a disk, it is theoretically possible to realize a double transfer rate compared to optical disk 101 including recording layers only on a single surface. Double-sided optical disk 110 is configured as a forward spiral (see FIG. 4) at one surface side and is configured as a reverse spiral (not illustrated) at the other surface side, and, consequently, allows data to be simultaneously recorded or played back.

Information recording and playback device 700 illustrated in FIG. 7 employs a configuration including four drives but a number of drives is not limited to this. Information recording and playback device 700 may include three drives or less or five drives or more.

2.2 Failure Prevention Diagnosis Processing

It is also possible to apply failure prevention diagnosis processing described in the first exemplary embodiment and failure prevention diagnosis processing which takes into account drive playback performance likewise to information recording and playback device 700 which supports double-sided optical disks according to the present exemplary embodiment. These types of processing have already been described and therefore will not be described hereinafter.

Figure 9:
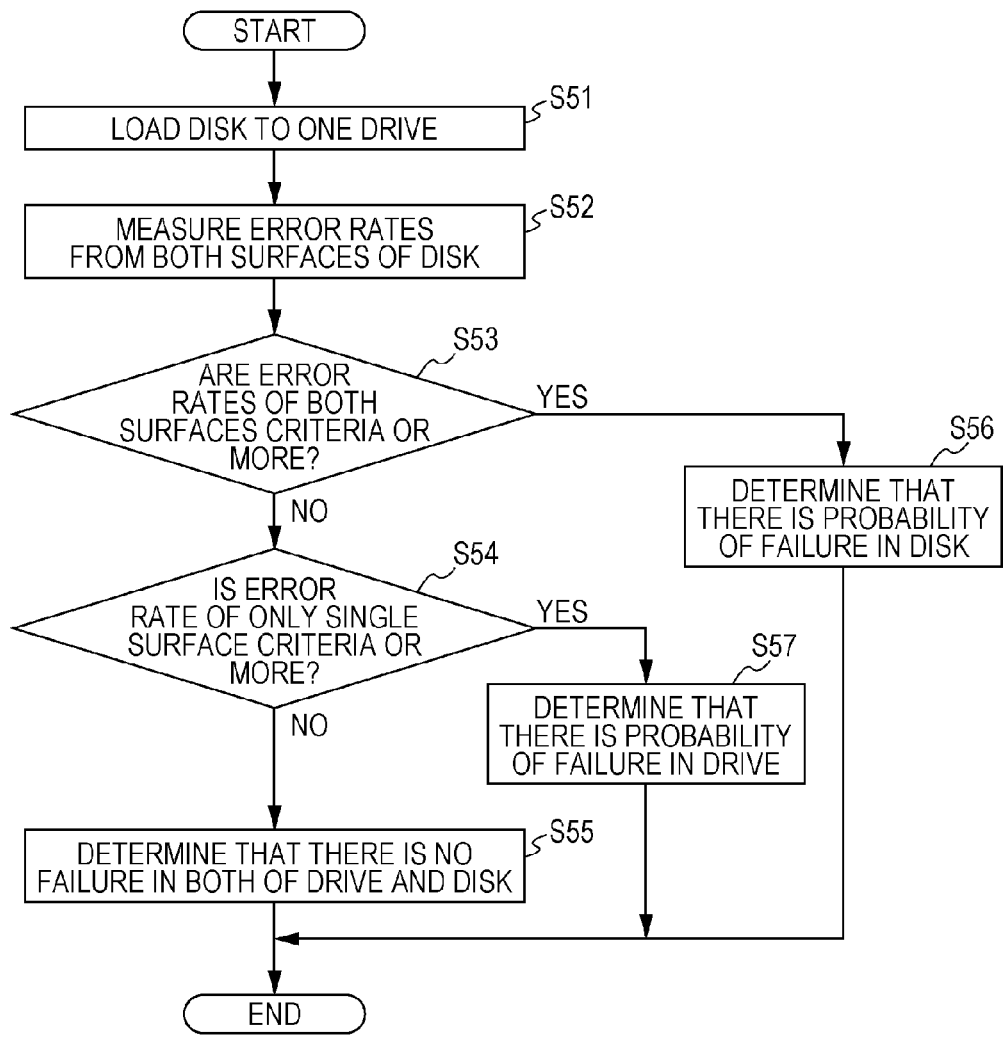
FIG. 9 is a flowchart illustrating failure prevention diagnosis processing of the information recording and playback device according to the second exemplary embodiment.

Failure prevention diagnosis processing based on error rates measured from both surfaces of double-sided optical disk 110 will be described with reference to a flowchart in FIG. 9.

In the failure prevention diagnosis processing, controller 111 of host server 109 first takes out diagnosis target optical disk 110 from magazine 103, and transmits a command to information recording and playback device 700 to load optical disk 110 to a diagnosis target drive (drive 704 in this case) (S51). In response to this command, mechanism controller 102 of information recording and playback device 700 takes out instructed optical disk 110 from magazine 103 and conveys instructed optical disk 110 to diagnosis target drive 704.

Subsequently, controller 111 of host server 109 transmits a command to information recording and playback device 700 to measure an error rate of each surface of optical disks 110 (S52). In response to this command, controllers 805a, 805b of drive 704 each measure error rates of the both surfaces of optical disk 110, and transmit a measurement result to host server 109.

Controller 111 of host server 109 determines a failure as follows based on the error rate measurement result received from drive 704.

Both surfaces of the double-sided optical disk are made of the same recording material, and data is recorded simultaneously on the both surfaces. In view of this, it is thought that, on the double-sided optical disk, a decrease in recording quality caused by aged deterioration of recording films deriving from prolonged storage of an optical disk progresses simultaneously on the both surfaces. Hence, controller 111 of host server 109 determines that there is a probability of a failure in optical disk 110 when both of the error rates measured in the both surfaces of the optical disk are criteria or more (YES in S53) (S56). Meanwhile, controller 111 determines that there is a probability of a failure in drive 704 when an error rate measured only from the single-side surface is the criteria or more (YES in S54) (S57). In this case, it is further determined that, in drive 704, there is a probability of a failure in a component (e.g. a pickup, a traverse mechanism or a controller) on a disk surface side whose error rate has been determined to be the criteria or more. Further, controller 111 determines that there is a low probability of a failure in both of optical disk 110 and drive 704 when the error rates measured from both surfaces are less than the criteria (NO in S54) (S55).

Thus, it is possible to determine failures in double-sided optical disks and drives which support the double-sided optical disks. By performing the above failure determination processing on each drive, it is possible to determine a failure of entire information recording and playback device 700.

Third Exemplary Embodiment

An information recording and playback device according to the present exemplary embodiment employs the same configuration as that described in the second exemplary embodiment, and is an information recording and playback device which can record or play back data in or from both disk surfaces of a double-sided optical disk (the same applies to the fourth and fifth exemplary embodiments).

In the present exemplary embodiment, a configuration of realizing a high speed access while maintaining recording and playback quality (while securing reliability of recording and playback) by taking into account a control residual of servo control performed on an optical disk.

Generally, in an optical disk manufacturing process, recording tracks vary in a height direction and vary in a width direction. The variation of a recording track in the height direction causes a focus error when the recording track is irradiated with laser light, and deteriorates recording and playback quality. Further, the variation of a recording track in the width direction causes a tracking error when the recording track is irradiated with laser light, and deteriorates recording and playback quality. Servo control is performed to reduce these two variations; however, a control residual remains depending on a frequency of a variation. In this regard, the control residual refers to an amount of difference between an actual control amount and a target value. When the control residual is significant, not only recording and playback quality deteriorates but also servo control also failures in some cases. That is, the control residual causes servo control to fail upon recording and playback, and a recording and playback operation is not normally performed.

A variation of a recording track generated in such an optical disk manufacturing process becomes more significant toward an outer circumference of an optical disk. Hence, the control residual deriving from a variation of a recording track rises as a radius at an outer circumference portion of an optical disk becomes larger as illustrated in FIG. 10A. Hence, in the present exemplary embodiment, a control residual in an area of an optical disk is measured to indicate the area of the optical disk to which a control residual of an allowable range is given, as an outer circumference position of this area, i.e., a radius (referred to as a "boundary radius" below).

More specifically, the outer circumference position of the area of the optical disk in which the control residual falls within predetermined criteria or less (the area in which the control residual is in an allowable range). In this regard, control residuals of a focusing operation and a tracking operation are measured, and an area in which the control residuals of both operations are the criteria or less is an area of an optical disk in which a control residual is allowable.

Further, recording and playback are performed at a high speed (e.g. 10-times speed) in an area at an inside of the boundary radius, and recording and playback are performed at a low speed (e.g. 5-times speed) in an area at an outside of a boundary radius. In, for example, an example illustrated in FIG. 10A, when the boundary radius is set to 57.4 mm, recording and playback are performed at a high speed (e.g. 10-times speed) at an inner circumference side of the boundary radius (57.4 mm), and recording and playback are performed at a low speed (5-times speed) at the outer circumference side of the boundary radius as illustrated in FIG. 10B.

(1) Specification Value of Boundary Radius of Optical Disk

A specification value which each optical disk needs to satisfy may be defined for a boundary radius, the boundary radius may be measured per disk upon shipping and only optical disks which satisfy a specification may be shipped. In this case, the boundary radius may be measured for all manufactured disks or may be measured for part of lots. In case of a double-sided optical disk, only optical disks which satisfy the specification on both surfaces are shipped.

For example, the specification value of the boundary radius is set to 57.4 mm (see FIG. 10A), and only optical disks which satisfy this specification are shipped. In an optical disk which satisfies this specification, the control residual is the criteria or less in an area whose radius is 57.4 mm.

(2) Information Indicating Minimum Boundary Radius Satisfying Specification Value is Recorded in Optical Disk In an optical disk manufacturing process, control residuals are measured from both disk surfaces to calculate boundary radii, and information indicating a smaller boundary radius may be recorded in a BCA (Burst Cutting Area). When, for example, one surface of an optical disk has a radius of 57.8 mm and the control residual satisfies the criteria, and the other surface has the radius of 57.4 mm or less and the control residual satisfies the criteria, the smaller radius of 57.4 mm is set as the boundary radius of an optical disk. Boundary radii may be measured for all media or may be partially measured per lot. Drives 704 to 707 of information recording and playback device 700 can recognize a boundary radius unique to each disk by referring to a BCA of each optical disk. Further, an ID or the like for identifying a manufacturer may be recorded in a BCA and a drive may determine a radius based on this ID. For example, when the ID indicates company A, the boundary radius may be 57.0 mm and, when an ID indicates company B, the boundary radius may be 57.6 mm. Further, an area to record an ID for identifying a manufacturer is not limited to a BCA. As long as a mode allows an ID to be recorded in advance in a disk, the ID may be recorded in any way.

(3) Boundary Radius of Disk is Measured Upon Insertion of Optical Disk into Drive A control residual is measured when an optical disk is inserted into a drive, and a boundary radius may be defined per disk based on the measured control residual. When the radii of both surfaces of the optical disk which satisfy the criteria are different, a smaller value is set as the boundary radius of the disk.

Recording and playback are performed at a high speed in an area at the inside of the boundary radius, and recording and playback are performed at a low speed at an outside of the boundary radius. By switching between a recording speed and a playback speed based on the boundary radius as a boundary, it is possible to avoid a failure of recording and playback in advance, to enable both maximization of a transfer rate and prevention of a failure and to improve reliability.

Processing of calculating boundary radii of an optical disk will be described by using the flowchart in FIG. 11A. Controller 111 of host server 109 transmits a command to information recording and playback device 700 to load predetermined double-sided optical disk 110 to a predetermined drive of drives 704 to 707 (S61). In response to this command, optical disk 110 is loaded to a predetermined drive of drives 704 to 707.

Next, controller 111 of host server 109 transmits a command to information recording and playback device 700 to measure a control residual and a boundary radius of each surface of optical disk 110 via the second interface (S62). Controllers 805a, 805b of the predetermined drive each measure a control residual per track by performing servo control on each surface. Further, controllers 805a, 805b each calculate a boundary (i.e. boundary radius) between an area in which a control residual exceeds the criteria and an area in which the control residual does not exceed the criteria, based on the measured control residual, and transmit the boundary to host server 109. Controller 111 of host server 109 determines the boundary radius of this optical disk 110 based on the received boundary radius of each surface, and stores the boundary radius in memory 113 (S63).

Figure 11A:
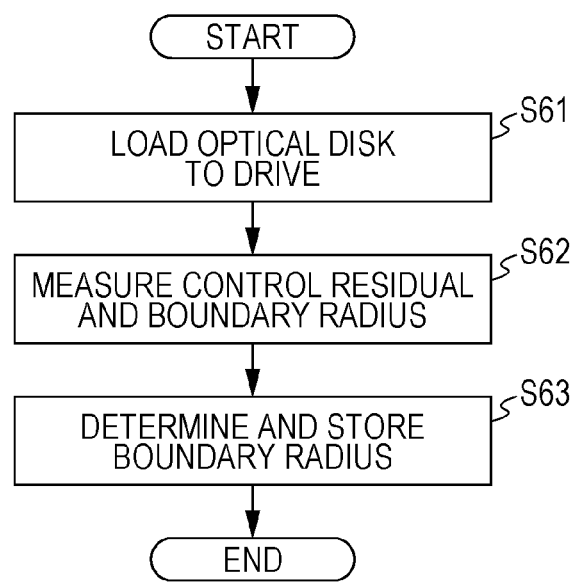
FIG. 11A is a flowchart illustrating processing of determining a boundary radius of an optical disk according to a third exemplary embodiment.

The processing of calculating the boundary radius of optical disk 110 illustrated in FIG. 11A only needs to be executed only once when optical disk 110 is inserted first into one of drives 704 to 707. A value of the boundary radius measured in this case may be stored in host server 109, or may be recorded in this optical disk 110. Alternatively, the value may be stored in memories 806a, 806b in drives 704 to 707.

Figure 11B:
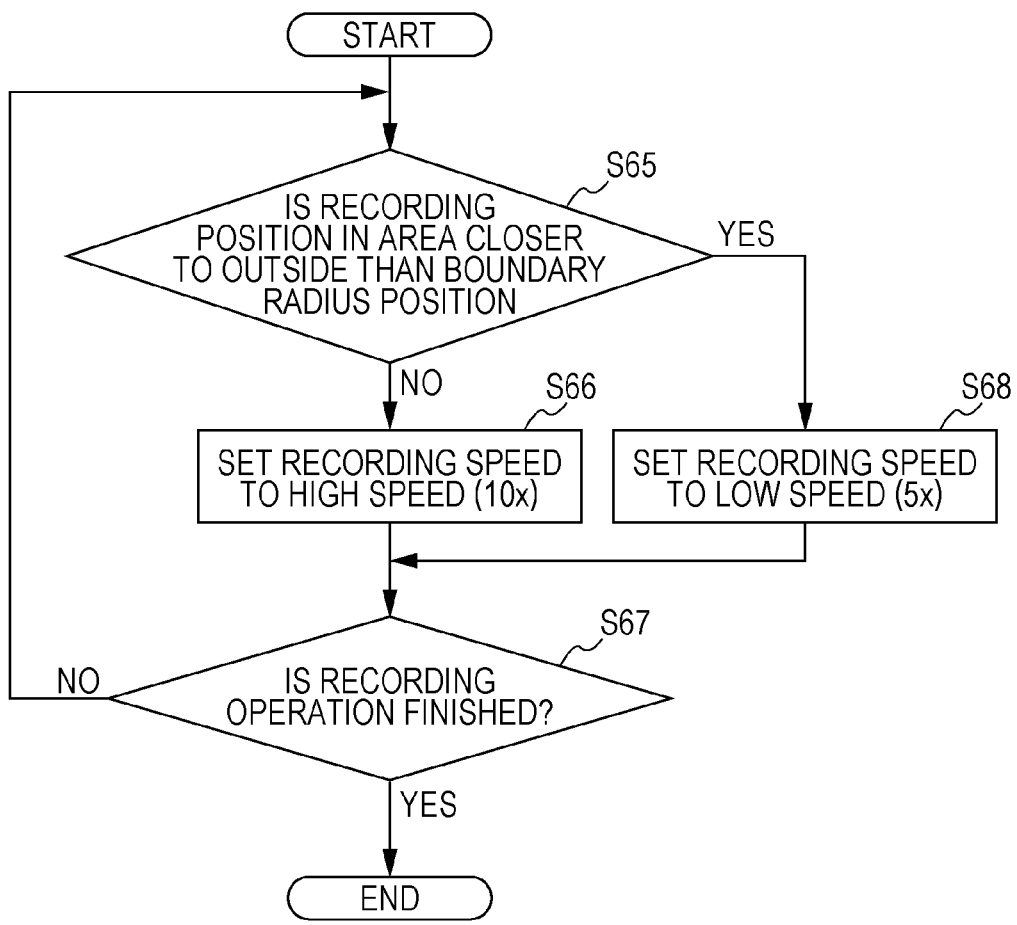
FIG. 11B is a flowchart illustrating processing of switching a recording speed based on a recording area of data according to the third exemplary embodiment.

FIG. 11B is a flowchart illustrating processing of setting a recording speed based on a recording position of optical disk 110. In response to a command to record to play back data in or from host server 109, controller 805a of each of drives 704 to 707 of information recording and playback device 700 executes the processing illustrated in FIG. 11B.

Controller 805a determines whether or not a position on a disk on which data needs to be recorded is in an area closer to an outside than the boundary radius (S65). Information of the boundary radius may be provided from host server 109, may be read from optical disk 110 when the information is recorded in optical disk 110, or may be read and obtained from a memory when the information is stored in the memory in each of drives 704 to 707. When a recording position is in an area closer to an inside than the position of the boundary radius, controller 805a controls motor 803 and sets the recording speed to a high speed (e.g. 10-times speed) (S66). Meanwhile, when a recording position is in an area closer to the outside than the position of the boundary radius, controller 805a sets the recording speed to a low speed (e.g. 5-times speed) (S68). The above processing is performed until a recording operation is finished (S67).

In addition, the flowchart in FIG. 11B has been described as processing of switching a recording speed upon a recording operation for ease of description. However, similar to a time of playback, a playback speed is switched based on a boundary radius as a boundary. That is, data is played back at a high speed (e.g. 10-times speed) in an area in which a control residual closer to the inside than the boundary radius position is small, and data is played back at a low speed (e.g. 5-times speed) in an area in which a control residual closer at the outside than the boundary radius position is large.

As described above, by switching a data access speed based on a boundary radius as a reference, it is possible to realize a high speed data access in an area in which the above servo residual is relatively low and which is closer to the inside. By accessing data at a low speed in an area at which the above servo residual is relatively high and which is closer to the outside, it is possible to secure reliability to record data or play back data.

Figure 12:
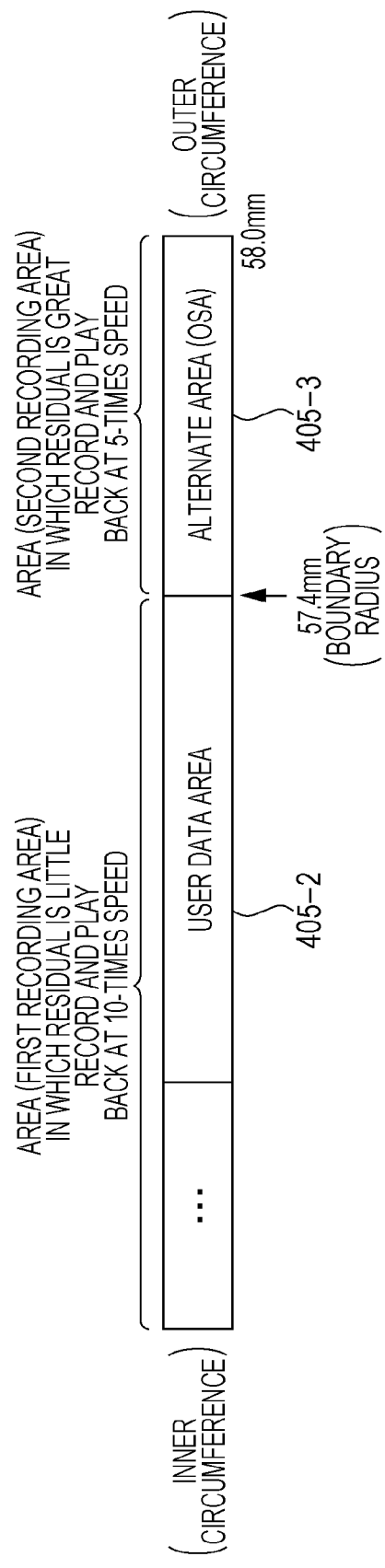
FIG. 12 is a view for explaining a user data area in which data is recorded at a high speed, and an alternate area in which data is recorded at a low speed.

FIG. 12 is a view for explaining a user data area in which data is recorded at a high speed and an alternate area in which data is recorded at a low speed according to the third exemplary embodiment. Further, according to a configuration of switching an access speed based on a boundary radius as a reference as described above, as illustrated in FIG. 12, user data area 405-2 may be set at an inside of a boundary radius position based on the boundary radius position as a boundary, and an alternate area (OSA (405-3)) of user data may be set at an outside of the boundary radius position. The alternate area is an area which is used for alternate recording of data recorded in a defect area in user data area 405-2, and is included in OSA (405-3).

For example, in the example illustrated in FIG. 12, an area closer to the inside than a position of the boundary radius (57.4 mm) is set as user data area 405-2, and an area closer to the outside than the position of the boundary radius (57.4 mm) is set as an alternate area (OSA (405-3)) of user data.

The user data is preferably recorded at as high a transfer rate as possible, and therefore user data area 405-2 in which user data is recorded is an area in which data can be recorded at a high speed. Meanwhile, the alternate area is required to provide high reliability, and therefore is set to an area in which data is recorded at a low speed to realize a predetermined error rate or less by prioritizing reliability compared to a recording speed and suppressing the servo residual. Consequently, it is possible to record data at a high speed and secure reliability.

An access speed (linear velocity) with respect to an optical disk is determined by a product of a rotation speed of a motor and a radius. Therefore, a maximum value of an access speed which can be realized by rotation of the motor changes depending on a radius position at which an access to data is made. That is, when an access to a position closer to an optical disk is made, a maximum speed (linear velocity) which the motor can achieve becomes slower. Hence, when a recording position is closer to a center of a disk, a predetermined high speed (10-times speed) cannot be realized in some cases. Hence, in reality, drives 704 to 707 each control an access speed as illustrated in FIG. 13.

Figure 13:
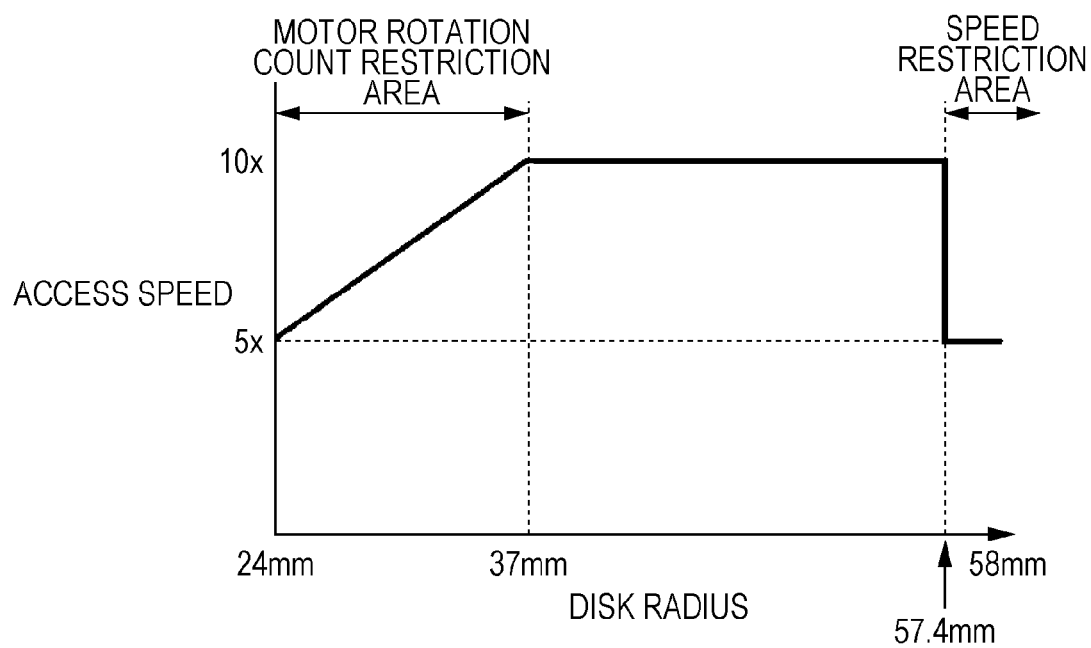
FIG. 13 is a view for explaining actual motor control performed to vary an access speed based on an access area according to the third exemplary embodiment.

FIG. 13 is a view for explaining that an upper limit of a number of rotations of the motor is 8000 rpm, and explaining control of motor 803 which can realize a 10-times speed at a position at which the radius is about 37 mm.

Controller 805a of each of drives 704 to 707 drives motor 803 at an upper limit of a rotation speed until a high speed access speed (10-times speed) is obtained, and maintains the rotation speed of motor 803 when the access speed reaches the high speed access speed. Further, when the access position reaches a boundary radius, controller 805a controls a rotation speed of motor 803 to lower the access speed to a low speed (5-times speed). In the example illustrated in FIG. 13, in an area in which the radius is closer to the inside than about 37 mm (motor rotation count restriction area), motor 803 is driven at an upper limit of the number of rotations. Further, when the recording speed reaches a high speed access speed (10-times speed) at a point of time at which the recording position reaches a position at which the radius is about 37 mm, controller 805a controls the number of rotations of motor 803, and fixes an access speed. Subsequently, when the access position enters an area at the outside of the boundary radius (57.4 mm), the access speed is limited to a low access speed (5-times speed). In addition, when motor 803 can be driven with a sufficiently high number of rotations even in the inner circumference, the motor rotation count restriction area may not be provided.

As described above, information recording and playback device 700 according to the present exemplary embodiment is an information recording and playback device which records or plays back data in or from optical disk 110. Information recording and playback device 700 includes drives 704 to 707 which record information by using laser light for optical disk 110, and controllers 805a, 805b which control drives 704 to 707.

Controllers 805a, 805b each divide a recording area of optical disk 110 into an area (an example of a first recording area) which is at the inner circumference side based on, as a boundary, a boundary radius (an example of a predetermined radius) in the radius direction of optical disk 110, and an area (an example of the second recording area) which is at the outer circumference side. Controllers 805a, 805b each control drives 704 to 707 (motor 803) to record or play back data in or from an area at the inner circumference side at a first speed (e.g. 10-times speed), and record data in an area at an outside at a second speed (e.g. 5-times speed) slower than the first speed.

The boundary radius is set to a boundary between an area in which a control residual exceeds criteria (predetermined reference value) when servo control related to focusing and tracking operations is performed on the recording area of optical disk 110, and an area in which the control residual does not exceed the criteria (see FIG. 10A).

As described above, by switching an access speed based on a boundary radius set based on a control residual, it is possible to make a high speed access to an area in which there is a low probability of failure of recording and playback, and reduce a processing time. Meanwhile, by making a low speed access to an area in which there is a high probability of a failure of recording and playback, a probability that an access fails is reduced. Consequently, it is possible to enhance reliability of recording and playback while realizing high speed recording and playback operations.

Fourth Exemplary Embodiment

As an access speed of an information recording and playback device to an optical disk becomes higher, track position fluctuations such as an eccentricity and a face deflection of an optical disk which are in synchronization with disk rotation become significant, and development of an optical disk device which can track these fluctuations is desired. However, a servo signal has characteristics that, as a number of rotations of a disk increases, an amplitude remains the same and only the frequency increases, and therefore a higher loop gain is required to maintain a servo residual at a defined value or less. Meanwhile, increasing a loop gain is limited due to a secondary resonance of a pickup, and, as a result, there is a problem of deterioration of tracking performance. Hence, repetitive memory control for servo control is developed as a technique of securing the above tracking performance (see, for example, Unexamined Japanese Patent Publication No. 2009-170102 and Unexamined Japanese Patent Publication No. H09-50303).

The repetitive memory control is a control method of reducing a residual by using a feature that residuals of adjacent areas are generated nearly likewise. According to the repetitive memory control, a control residual obtained upon servo control is stored in a memory while moving a pickup, and servo control is performed on an access target track by using the control residual stored in a memory related to a track adjacent to the access target track. Thus, it is possible to reduce a control residual which can be generated, and cancel a fluctuation of a track position.

In the present exemplary embodiment, control for effectively using such repetitive memory control and improving reliability upon data recording and playback will be described. An operation of recording or playing back data in or from an area in which a control residual of an outer circumference portion of optical disk 110 is large (an area closer to an outside than a boundary radius position) will be described.

Figure 14:
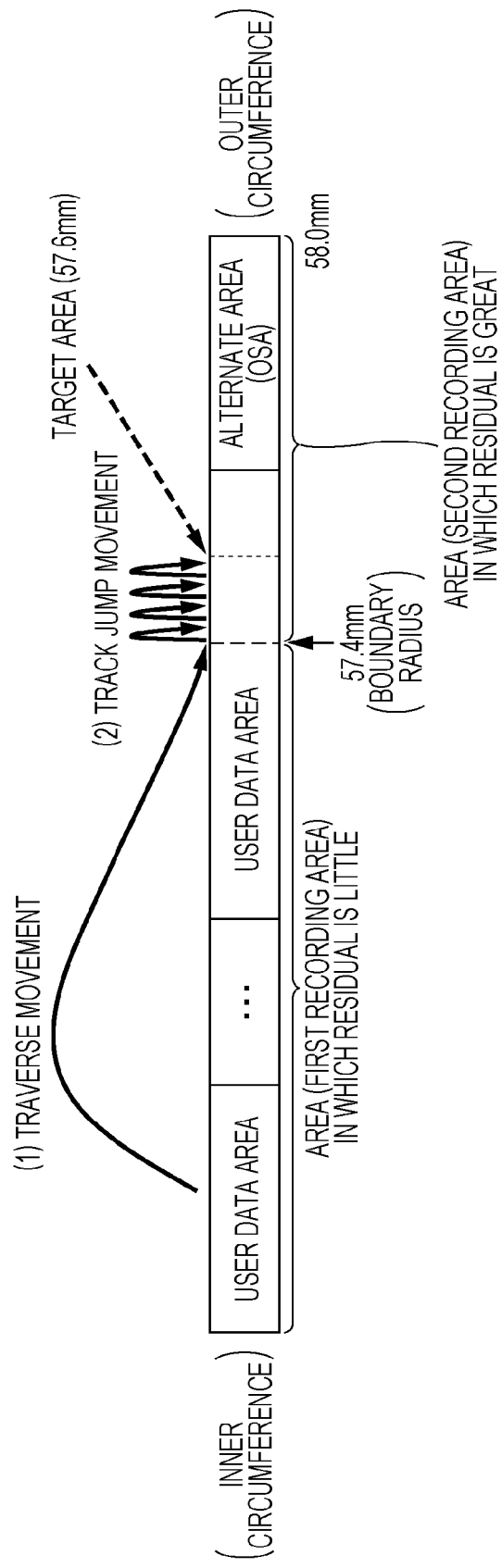
FIG. 14 is a view for explaining processing upon a data access according to a fourth exemplary embodiment.

More specifically, when an instruction of making an access to (recording or playing back) an area in which a control residual is large (an area closer to the outside than a boundary radius position) is received from host server 109, the pickup is moved to the boundary radius position as illustrated in FIG. 14. Subsequently, while causing the pickup to make a track jump from the boundary radius position to a target area, the control residual is stored in the memory. When the pickup reaches the target area, an access to data is started while repetitive memory control is performed by using the control residual stored in the memory. FIG. 14 is a view for explaining processing upon a data access according to the fourth exemplary embodiment.

Figure 15:
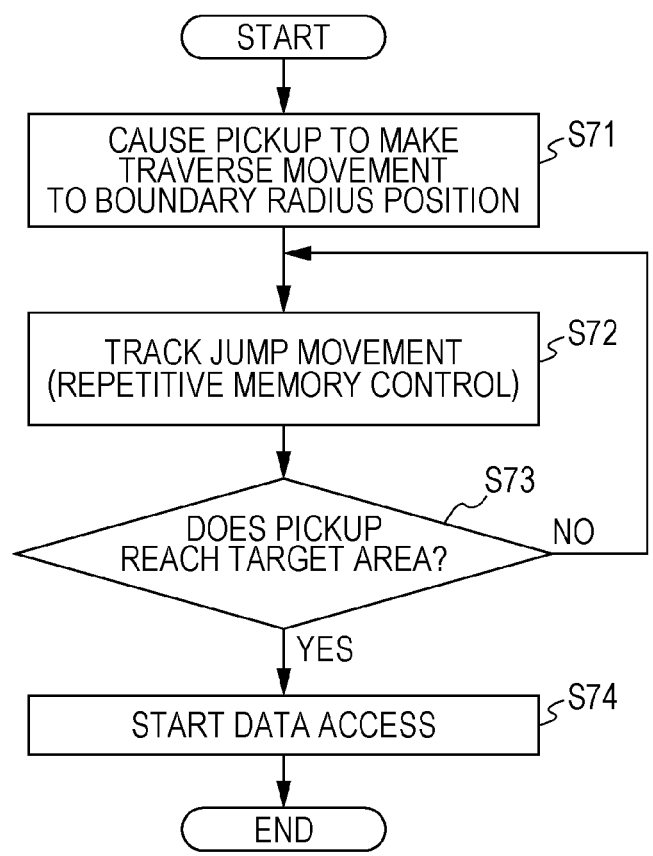
FIG. 15 is a view for explaining processing of an information recording and playback device according to the fourth exemplary embodiment.

FIG. 15 is a flowchart illustrating control of a drive when an access to (recording or playing back) data is started from an area in which a control residual is large (the area closer to the outside than the boundary radius position) according to the present exemplary embodiment.

When receiving from host server 109 an instruction to make an access to (recording or playing back) data in the target area in the area in which the control residual is large (the area closer to the outside than the boundary radius position), controllers 805*a*, 805*b* of each of drives 704 to 707 each control traverse mechanisms 802*a*, 802*b*, and cause pickups 801*a*, 801*b* to make traverse movement to the boundary radius position (S71).

Subsequently, controllers 805*a*, 805*b* cause pickups 801*a*, 801*b* to make track jump movement to the target area (S72, S73). During this track jump movement, controllers 805*a*, 805*b* perform repetitive memory control, but do not record or play back data.

When pickups 801*a*, 801*b* reach the target area, controllers 805*a*, 805*b* start accessing (recording or playing back) data (S74).

As described above, information recording and playback device 700 according to the present exemplary embodiment includes pickups 801*a*, 801*b* which perform irradiation with laser light, drives 704 to 707 (an example of recording and playback units) which record or play back information by irradiating optical disk 110 with the laser light, and controllers 805*a*, 805*b* which control each drive.

The controllers 805*a*, 805*b* each divide a recording area of optical disk 110 into a first recording area which is at an inner circumference side based on, as a boundary, a boundary radius in a radius direction of the optical disk, and a second recording area which is at an outer circumference side, and manages the recording area. The boundary radius is set to an edge of an area in which a control residual falls within predetermined criteria or less when servo control related to focusing and tracking is performed on the recording area of the optical disk.

When recording or playing back data from a target position in the second recording area, controllers 805*a*, 805*b* each cause pickups 801*a*, 801*b* to make traverse movement to an innermost circumference position of the second recording area, causes pickups 801*a*, 801*b* to move while performing the servo control on pickups 801*a*, 801*b* after the traverse movement, and store the control residual in memories 806*a*, 806*b* (an example of memory means) of this servo control (see FIG. 14). Further, when pickups 801*a*, 801*b* reach the target position, controller 806*a*, 806*b* each perform the servo control (repetitive memory control) by using the control residuals stored in memories 806*a*, 806*b*, and starts recording or playing back the data from the target position.

Thus, when an access to an area in which a residual is large (an outer side area of a boundary radius position) is made, the pickups are moved to an outermost circumference (boundary radius position) of an area in which the residual is small and then are caused to make a track jump to a target position. When the track jump is made, information of a control residual is stored in the memory. Consequently, it is possible to perform repetitive memory control from the target position, and perform accurate servo control. As a result, it is possible to make a reliable access. In addition, the access includes a seeking operation, in addition to recording and playback.

Fifth Exemplary Embodiment

In the present exemplary embodiment, a method different from a method according to the fourth exemplary embodiment will be described in terms of use of repetitive memory control.

Figure 16:
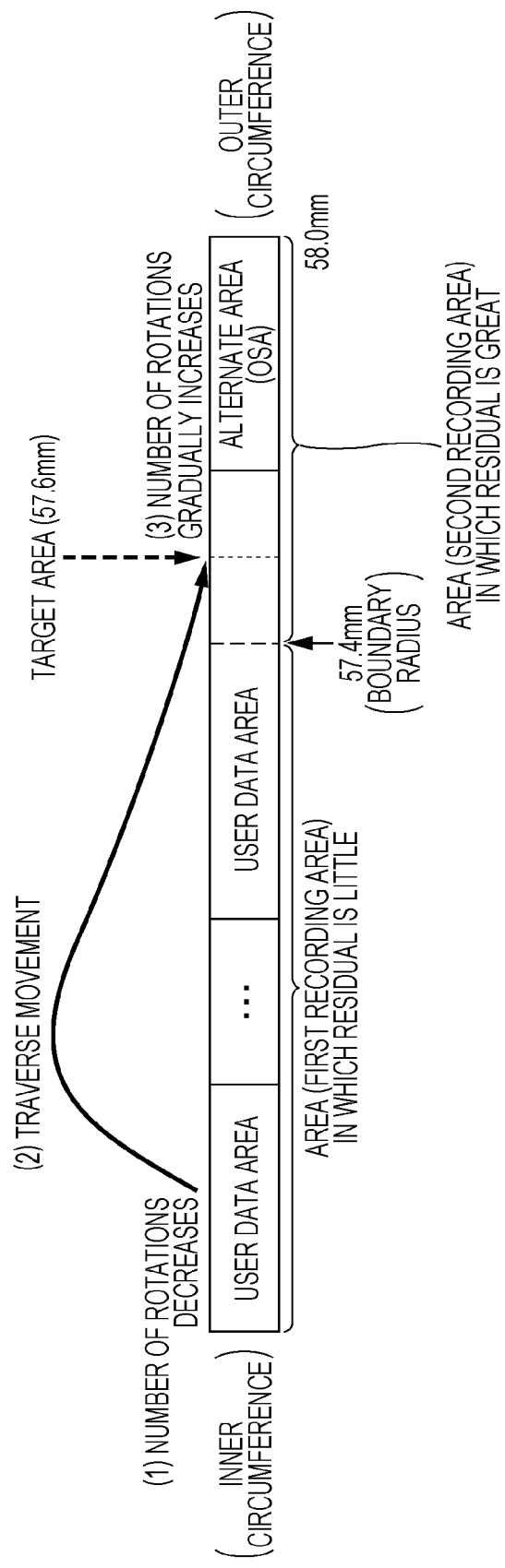
FIG. 16 is a view for explaining processing upon a data access according to a fifth exemplary embodiment.

More specifically, when an instruction of making an access to (recording or playing back) an area in which a control residual is large (an area closer to the outside than a boundary radius position) is received from host server 109, the number of rotations of motor 803 is decreased and then pickups are caused to make traverse movement to a target area as illustrated in FIG. 16. Subsequently, while gradually increasing a number of rotations of the motor, servo control is performed without moving a track, and control residuals are stored in memories 806*a*, 806*b*. Subsequently, when the number of rotations of motor 803 reaches a predetermined number of rotations, an access to data is started while performing repetitive memory control by using the control residuals stored in memories 806*a*, 806*b*. FIG. 16 is a view for explaining processing upon a data access according to the fifth exemplary embodiment.

Figure 17:
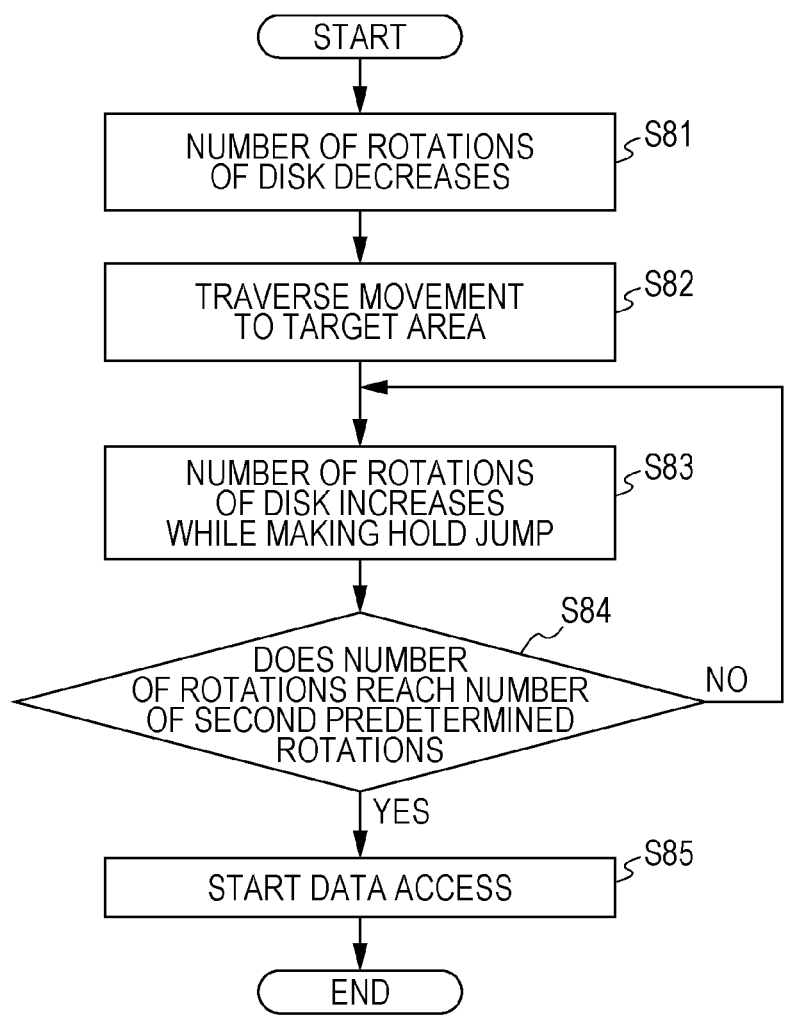
FIG. 17 is a view for explaining processing of an information recording and playback device according to the fifth exemplary embodiment.

FIG. 17 is a flowchart illustrating control of a drive when an access to (recording or playing back) data is started from an area in which a control residual is large (the area closer to the outside than the boundary radius position).

When receiving from host server 109 an instruction to make an access to (record or play back) data in a target area in an area in which the control residual is large (the area closer to the outside than the boundary radius position), controller 805*a* controls motor 803 to decrease the number of rotations of the motor to a first predetermined number of rotations (the number of rotations lower than the number of rotations which realizes a 5-times speed) (S81). Subsequently, controllers 805*a*, 805*b* each control traverse mechanisms 802*a*, 802*b*, and cause pickups 801*a*, 801*b* to make traverse movement to the target area (S82). After the movement, controller 805*a* gradually increases the number of rotations of motor 803 until motor 803 reaches a second predetermined number of rotations (the number of rotations which realizes a 5-times speed) (S83, S84). In this case, controllers 805*a*, 805*b* each increase the number of rotations while making a hold jump (without moving a track) without recording information. While the number of rotations is increased, a control residual of the same track is measured and is held in memories 806*a*, 806*b*. Subsequently, when the number of rotations of the motor reaches the predetermined number of rotations (the number of rotations which realizes the 5-times speed), controller 805*a* starts recording data from a target position (S85). In addition, an access is made to an area in which a control residual is small (an area closer to the inside than the boundary radius position) at a high speed (10-times speed) as described above.

As described above, in information recording and playback device 700 according to the present exemplary embodiment, when recording or playing back data from a target position in a second area at an outer circumference side of a boundary radius, controllers 805*a*, 805*b* each reduce the number of rotations of optical disk 110 and then cause pickups 801*a*, 801*b* to make traverse movement to a target position. Controllers 805*a*, 805*b* each perform servo control on pickups 801*a*, 801*b* while increasing the number of rotations of optical disk 110 in an area to which the traverse movement has been made, and store a control residual of this servo control in memories 806*a*, 806*b* (an example of memory means). Subsequently, when the number of rotations of optical disk 110 reaches a predetermine number of rotations, controllers 805*a*, 805*b* each perform the servo control (repetitive memory control) by using the control residuals stored in the memories, and start recording or playing back the data from the target position.

Thus, when an access is made to a target position in an area in which a control residual is large (the area closer to the outside than the boundary radius position), controllers 805a, 805b each reduce the number of rotations to such a number of rotations that an influence of a control residual is little before movement to the target position is made, and move pickups 801a, 801b to the target area. Further, the number of rotations is gradually increased in this area. The number of rotations is reduced, so that it is possible to perform servo control in the area in which the control residual is large, and accumulate control residuals which are used for repetitive memory control. When information of the control residuals is accumulated, it is possible to perform repetitive memory control by using the control residuals, and reduce the control residuals. As a result, it is possible to stably access optical disks and improve reliability.

Other Exemplary Embodiments

As described above, the first to fifth exemplary embodiments have been described as the exemplary technique disclosed in this application. However, the technique according to the present disclosure is not limited to this, and is applicable to exemplary embodiments, too, which are optimally changed, replaced, added and omitted. Further, new exemplary embodiments can also be provided by combining each component described in the first to fifth exemplary embodiments. Hereinafter, other exemplary embodiments will be described below.

In the above exemplary embodiments, controllers 305, 805a, 805b in information recording and playback device 100, 700 have been illustrated as an example of a controller. These controllers 305, 805a, 805b can be realized by semiconductor integrated circuits such as an IC, an LSI or a VLSI. Further, this function may be realized by combining software and hardware or may be realized only by hardware (electronic circuit). Such a controller can be realized by a microcomputer, a CPU, an MPU, a DSP, an ASIC or an FPGA. The same applies to controller 111 in host server 109.

In the above exemplary embodiments, an optical disk is a write-once type recording medium and an optical disk may be a rewritable disk.

As described above, the exemplary embodiments have been described as an illustrative technique according to the present disclosure. For this illustration, the accompanying drawings and the detailed description have been provided.

Accordingly, components disclosed in the accompanying drawings and the detailed description include not only components which are indispensable to solve the problem but also components which are not indispensable to solve the problem in order to illustrative the above technique. Hence, it should not be acknowledged that those components which are not indispensable are disclosed in the accompanying drawings and the detailed description means that those components which are not indispensable are dispensable.

Further, the above exemplary embodiments are provided to illustrate the technique in the present disclosure, and therefore can be variously changed, replaced, added and omitted in the claims or in a range equivalent to the claims.

What is claimed is:

1. An information recording and playback device which records or plays back data in or from an optical disk, the device comprising:
    a recording and playback unit which records or plays back the data in or from the optical disk by using laser light; and
    a controller which controls the recording and playback unit, wherein
    the controller
        divides a recording area of the optical disk into a first recording area which is at an inner circumference side based on, as a boundary, a predetermined radius in a radius direction of the optical disk, and a second recording area which is at an outer circumference side, and manages the recording area, and
        controls the recording and playback unit such that the recording and playback unit records or plays back data in the first recording area at a first speed, and records or plays back data in the second recording area at a second speed slower than the first speed, and
    the predetermined radius is set to a boundary between an area in which a control residual exceeds a predetermined reference value when servo control related to focusing and tracking is performed on the recording area of the optical disk, and an area in which the control residual does not exceed the predetermined reference value.

2. The information recording and playback device according to claim 1, wherein
    the first recording area is an area in which user data is recorded, and
    the second recording area includes an alternate area in which data for replacing the user data recorded in the first recording area is recorded.

3. The information recording and playback device according to claim 1, wherein the controller performs the servo control related to the focusing and the tracking on the recording area of the optical disk, and calculates the predetermined radius based on the control residual of the servo control.

4. The information recording and playback device according to claim 1, wherein
    the optical disk includes recording areas in a first surface and a second surface, and
    the controller divides the recording area into the first recording area and the second recording area in each of the first and second surfaces of the optical disk, manages the recording area, and sets the predetermined radius in the first surface and a predetermined radius in the second surface to a same value.

5. The information recording and playback device according to claim 1, wherein information indicating the predetermined radius is recorded in the optical disk.

6. An information recording and playback device which records or plays back data in or from an optical disk, the device comprising:
    a recording and playback unit which includes a pickup performing irradiation with laser light, irradiates the optical disk with the laser light and records or plays back information; and
    a controller which controls the recording and playback unit, wherein
    the controller divides a recording area of the optical disk into a first recording area which is at an inner circumference side based on, as a boundary, a predetermined radius in a radius direction of the optical disk, and a second recording area which is at an outer circumference side, and manages the recording area,
    the predetermined radius is set to an edge of an area in which a control residual falls within a predetermined reference value or less when servo control related to focusing and tracking is performed on the recording area of the optical disk, and
    when recording or playing back data from a target position in the second recording area, the controller causes the pickup to make traverse movement to an innermost circumference position of the second recording area, causes the pickup to move while performing the servo control on the pickup after the traverse movement, and stores the control residual of the servo control in a memory, and when the pickup reaches the target position, performs the servo control by using the control residual stored in the memory, and starts recording or playing back the data from the target position.

7. An information recording and playback device which records or plays back data in or from an optical disk, the device comprising:

a recording and playback unit which includes a pickup which performs irradiation with laser light, irradiates the optical disk with the laser light and records or plays back information; and a controller which controls the recording and playback unit, wherein the controller divides a recording area of the optical disk into a first recording area which is at an inner circumference side based on, as a boundary, a predetermined radius in a radius direction of the optical disk, and a second recording area which is at an outer circumference side, and manages the recording area, the predetermined radius is set to an edge of an area in which a control residual falls within a predetermined reference value or less when servo control related to focusing and tracking is performed on the recording area of the optical disk, and when recording or playing back data from a target position in the second recording area, the controller reduces a number of rotations of the optical disk, causes the pickup to make traverse movement to the target position, performs the servo control on the pickup while increasing the number of rotations of the optical disk in an area to which the pickup has made the traverse movement, and stores a control residual of the servo control in a memory, and when the number of rotations of the optical disk reaches a predetermine number of rotations, performs the servo control by using the control residual stored in the memory, and starts recording or playing back the data from the target position.

* * * * *